(12) United States Patent
Gautam et al.

(10) Patent No.: US 8,377,372 B2
(45) Date of Patent: *Feb. 19, 2013

(54) DYNAMIC LANCES UTILIZING FLUIDIC TECHNIQUES

(75) Inventors: Vivek Gautam, Bear, DE (US); Michael G. K. Grant, Versailles (FR); Taekyu Kang, Wilmington, DE (US); Nicolas Docquier, Philadelphia, PA (US); Farrukh Alvi, Tallahassee, FL (US); Ryan B. Adelman, Wilmington, DE (US)

(73) Assignees: L'Air Liquide Societe Anonyme pour l'Etude et l'Exploitation des Procedes Georges Claude, Paris (FR); American Air Liquide, Inc., Fremont, CA (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/628,130

(22) Filed: Nov. 30, 2009

(65) Prior Publication Data

US 2011/0127703 A1 Jun. 2, 2011

(51) Int. Cl.
*C21B 7/16* (2006.01)

(52) U.S. Cl. ......................................... 266/225; 266/268

(58) Field of Classification Search .................. 266/225, 266/268
See application file for complete search history.

(56) References Cited

U.S. PATENT DOCUMENTS

| | | | |
|---|---|---|---|
| 4,965,813 A | 10/1990 | Udo | |
| 5,366,537 A | 11/1994 | Schlichting | |
| 5,702,502 A | 12/1997 | Kundrat et al. | |
| 5,814,125 A | 9/1998 | Anderson et al. | |
| 5,823,762 A | 10/1998 | Anderson et al. | |
| 5,904,895 A | 5/1999 | Gitman et al. | |
| 5,931,985 A | 8/1999 | Schoeler et al. | |
| 5,946,340 A | 8/1999 | Ramthun et al. | |
| 5,954,855 A | 9/1999 | Gitman et al. | |
| 6,096,261 A | 8/2000 | Anderson et al. | |
| 6,125,133 A | 9/2000 | Mathur et al. | |
| 6,139,310 A | 10/2000 | Mahoney et al. | |
| 6,176,894 B1 | 1/2001 | Anderson et al. | |
| 6,235,084 B1 | 5/2001 | Scholer et al. | |
| 6,289,035 B1 | 9/2001 | Shver | |
| 6,322,610 B1 * | 11/2001 | Pavlicevic et al. | 266/225 |
| 6,342,086 B1 | 1/2002 | Shver | |
| 6,372,010 B1 | 4/2002 | Shver et al. | |

(Continued)

FOREIGN PATENT DOCUMENTS

| | | |
|---|---|---|
| DE | 33 40 472 | 5/1985 |
| EP | 0 012 537 | 6/1980 |

(Continued)

OTHER PUBLICATIONS

PCT/US2010/058378 International Search Report and Written Opinion, mailed Apr. 4, 2011.

(Continued)

*Primary Examiner* — Scott Kastler
(74) *Attorney, Agent, or Firm* — Christopher J. Cronin

(57) ABSTRACT

A jet of gas injected from a lance is fluidically deviated with a gas flowing in either the same or opposite direction as the jet of gas. The gas used to fluidically deviate the jet is the same as or different from the gas in the jet.

16 Claims, 33 Drawing Sheets

U.S. PATENT DOCUMENTS

| | | | |
|---|---|---|---|
| 6,383,445 | B1 | 5/2002 | Anderson et al. |
| 6,400,747 | B1 | 6/2002 | Mathur |
| 6,432,163 | B1 | 8/2002 | Sarma et al. |
| 6,432,165 | B1 | 8/2002 | Dittrich et al. |
| 6,450,799 | B1 * | 9/2002 | Mahoney et al. ............ 266/225 |
| 6,514,310 | B2 | 2/2003 | Allemand et al. |
| 6,614,831 | B2 | 9/2003 | Shver |
| 6,669,838 | B1 | 12/2003 | Baarman |
| 6,749,661 | B2 | 6/2004 | Shver |
| 6,875,398 | B2 | 4/2005 | Mahoney |
| 6,910,431 | B2 | 6/2005 | Satchell, Jr. |
| 6,932,854 | B2 | 8/2005 | Riley et al. |
| 7,258,831 | B2 | 8/2007 | Vecchiet et al. |
| 7,384,594 | B2 | 6/2008 | Meyn et al. |
| 7,611,563 | B2 * | 11/2009 | Memoli et al. ............... 266/268 |
| 2001/0052200 | A1 | 12/2001 | Londero et al. |
| 2003/0000338 | A1 | 1/2003 | Shver |
| 2003/0075843 | A1 | 4/2003 | Wunsche |
| 2006/0060028 | A1 | 3/2006 | Cameron et al. |
| 2007/0267787 | A1 | 11/2007 | Higgins et al. |
| 2008/0000325 | A1 | 1/2008 | Mahoney et al. |
| 2008/0134838 | A1 | 6/2008 | Memoli et al. |
| 2011/0127701 | A1 | 6/2011 | Grant et al. |
| 2011/0127703 | A1 | 6/2011 | Gautam et al. |

FOREIGN PATENT DOCUMENTS

| | | |
|---|---|---|
| EP | 1 213 364 | 6/2002 |
| EP | 2 080 972 | 7/2009 |
| EP | 2 080 973 | 7/2009 |
| FR | 2 860 243 | 4/2005 |
| FR | 2 926 296 | 7/2009 |
| GB | 997 875 | 7/1965 |
| JP | 62 033 710 | 2/1987 |
| JP | 7 113 585 | 5/1995 |
| JP | 7 280 460 | 10/1995 |
| WO | WO 2007 054 957 | 5/2007 |
| WO | WO 2008 003 907 | 1/2008 |
| WO | WO 2008 076 901 | 6/2008 |

OTHER PUBLICATIONS

PCT/US2010/058368 International Search Report and Written Opinion, mailed Feb. 23, 2011.

PCT/US2010/058360 International Search Report and Written Opinion, mailed Feb. 23, 2011.

Alvi, et al., "Vectoring Thrust in Multiaxes Using Confined Sheer Layers," Journal of Fluid Engineering, vol. 122, No. 1, Mar. 2000, pp. 3-13.

Allemand, et al., "Theoretical and Experimental Study of Supersonic Oxygen Jets Industrial Application in EAF," Revue de Metalurgie, Cahiers D'Informations Techniques, Revue De Metallurgie, Paris, France, vol. 98, No. 6, Jun. 1, 2001, pp. 571-587.

Chiarelli, et al., "Fluidic Scale Model Multiplane Thrust Vector Control Test Results," AIAA 29th Joint Propulsion Conference, AIAA-93-2433, Jun. 1993.

Januard, et al., "Dynamic Control of Fossil Fuel Injection through Continuous Fumes Monitoring," International European Electric Steelmaking Conference, May 2005.

Mason, et al., "Fluidic Thrust Vectoring Forlow Observable Air Vehicles," 2nd AIAA Flow Control Conference, Portland, Oregon, USA, 2004.

Memoli, et al., "Simulation of Oxygen Penetration and Decarburization in EAF Using Supersonic Injection System," ISIJ International, vol. 44, No. 8, 2004, pp. 1342-1349.

U.S. Appl. No. 12/628,105, Office Action dated Dec. 15, 2011, 7 pages.

U.S. Appl. No. 12/628,124, Office Action dated Dec. 28, 2011, 8 pages.

U.S. Appl. No. 12/628,124, Final Office Action dated May 7, 2012, 6 pages.

* cited by examiner

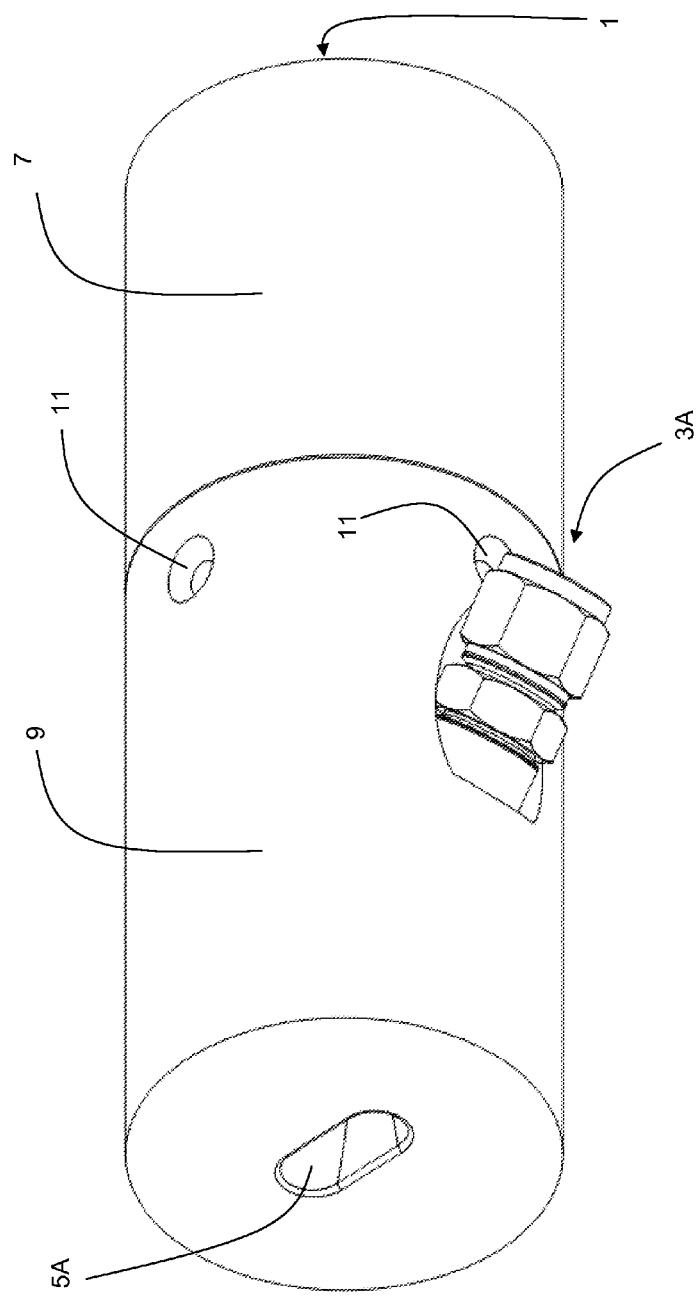

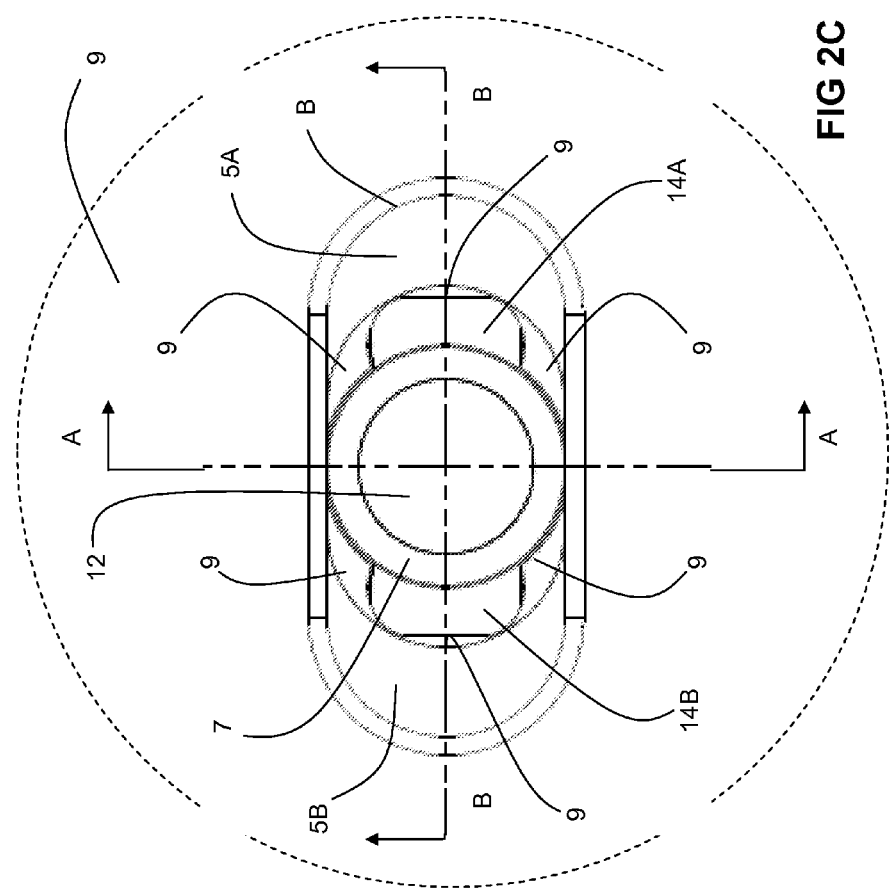

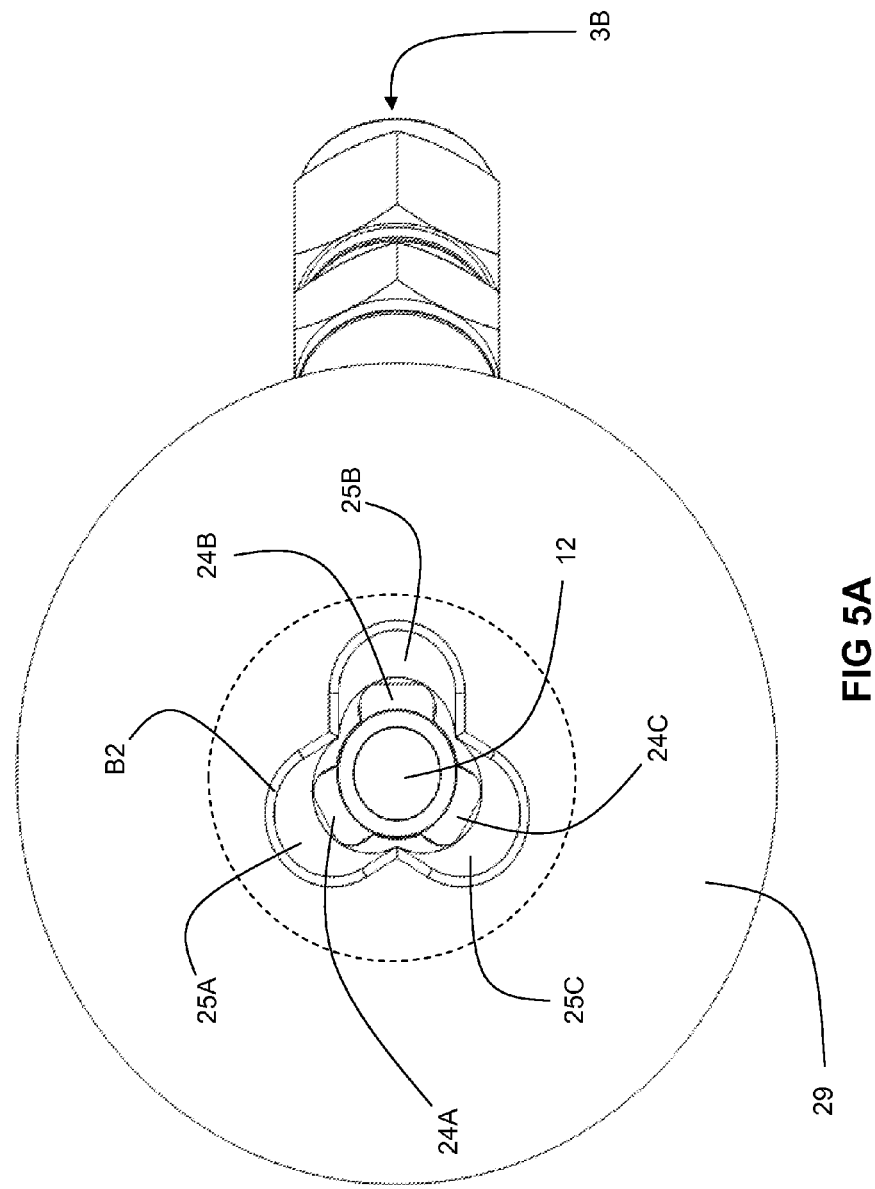

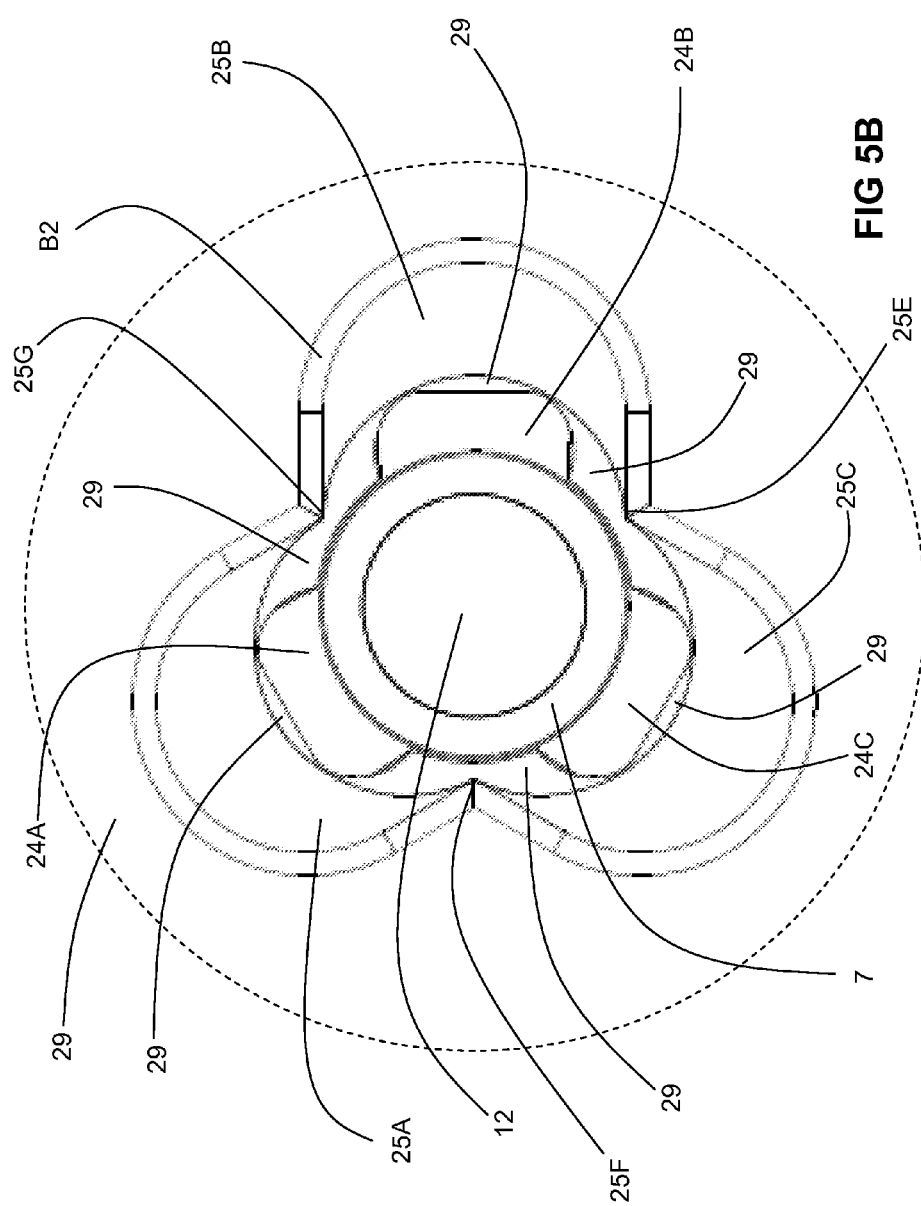

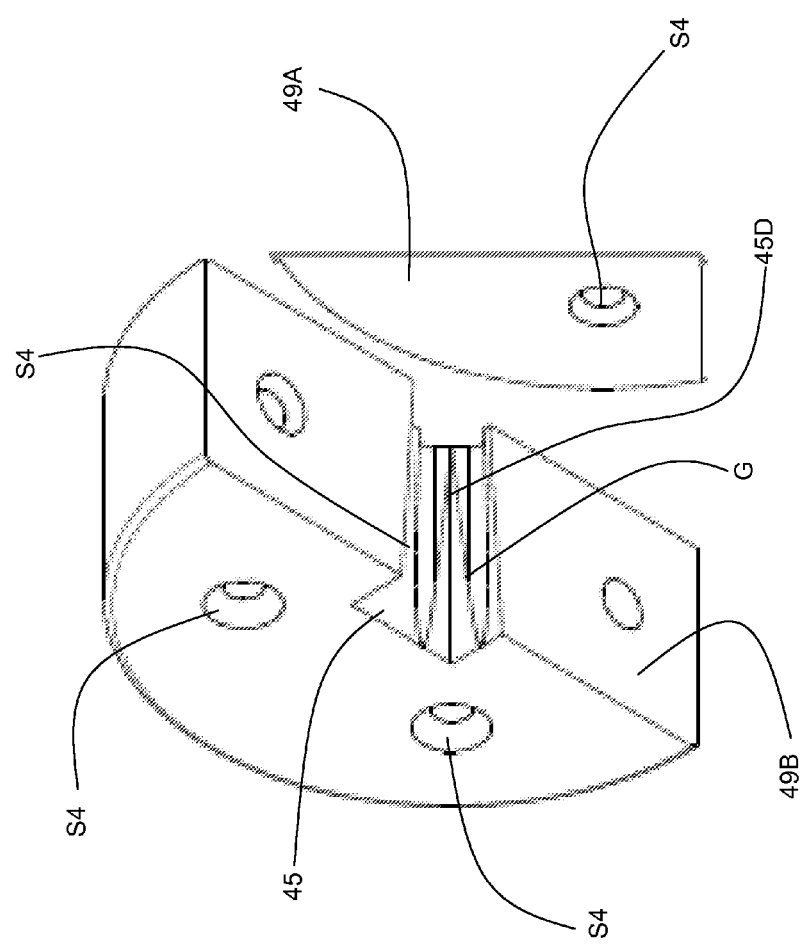

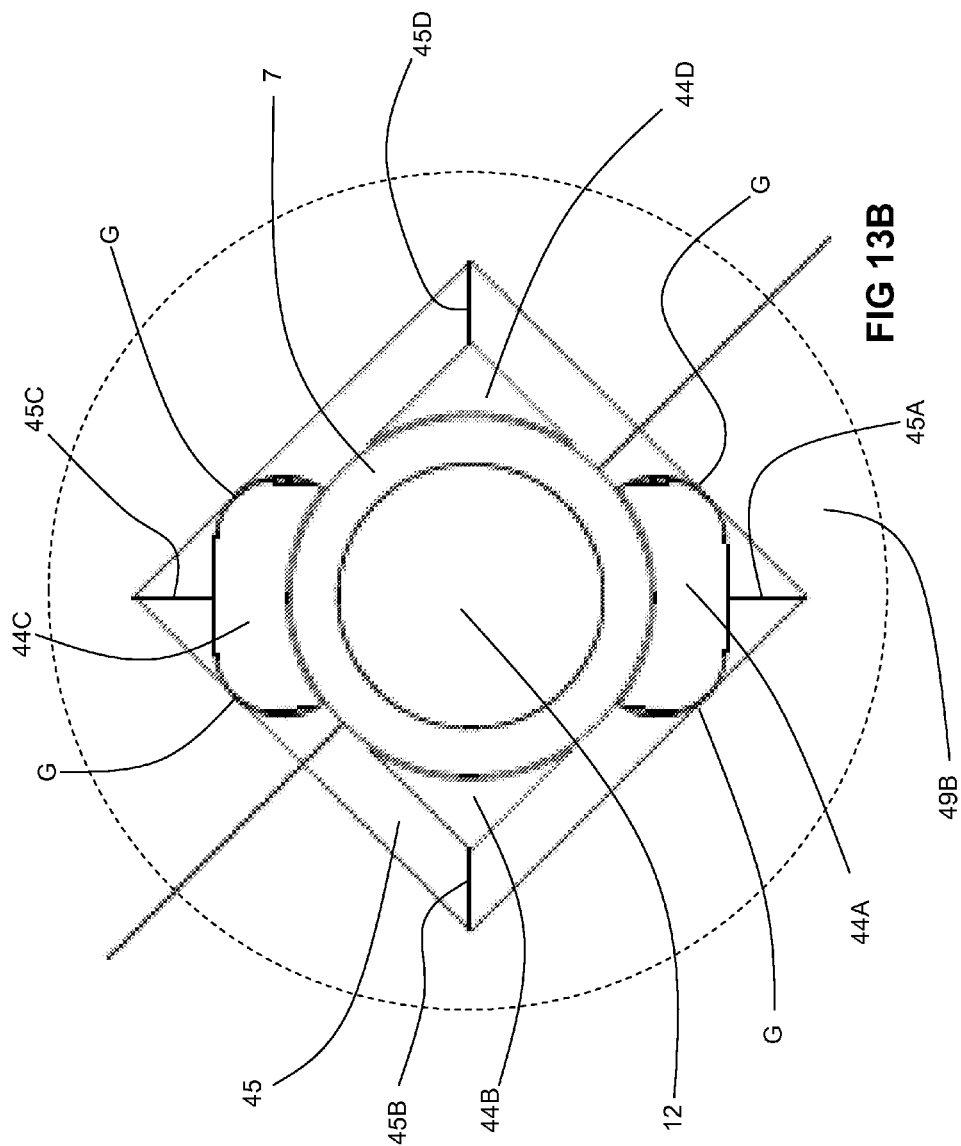

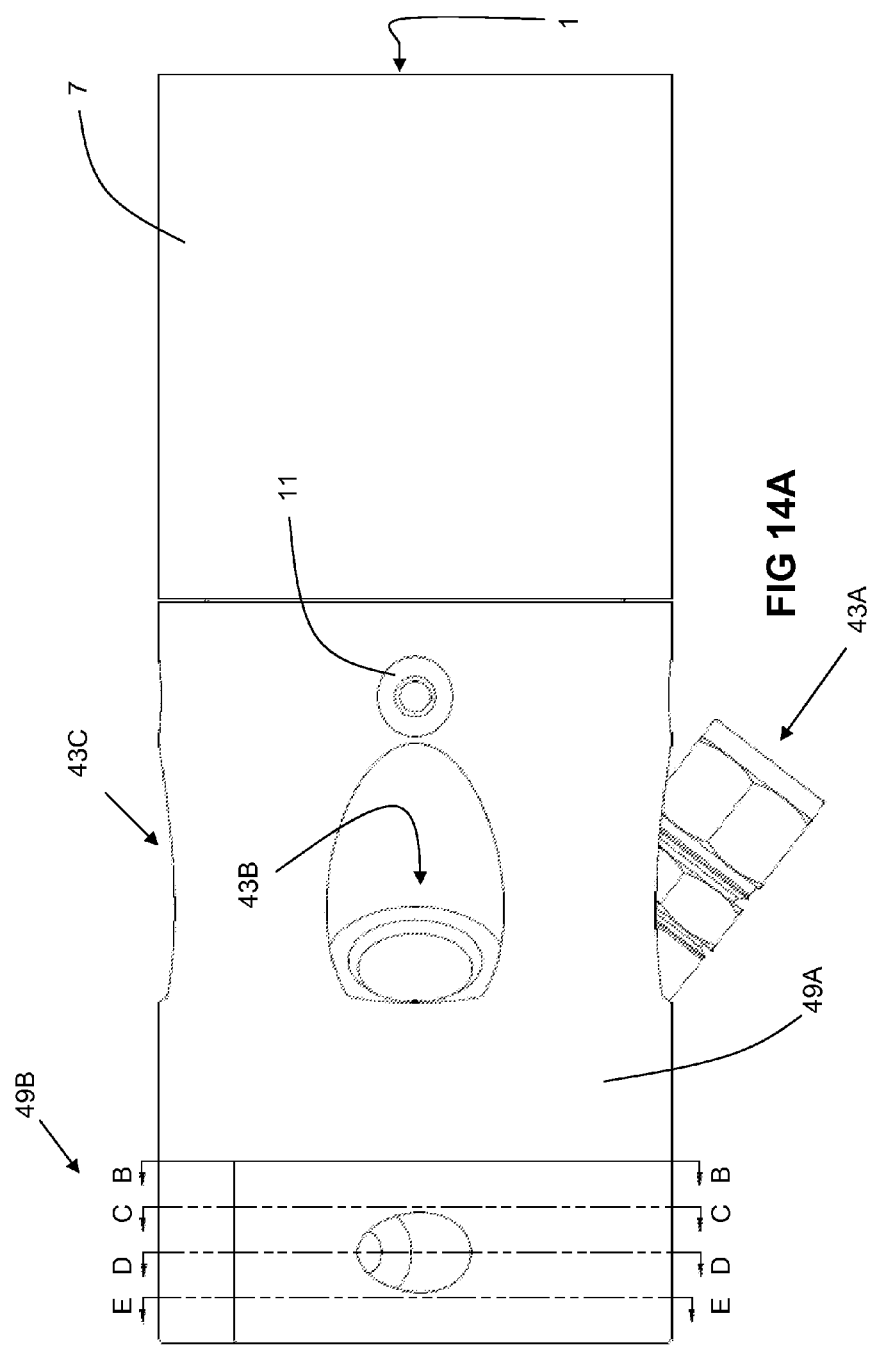

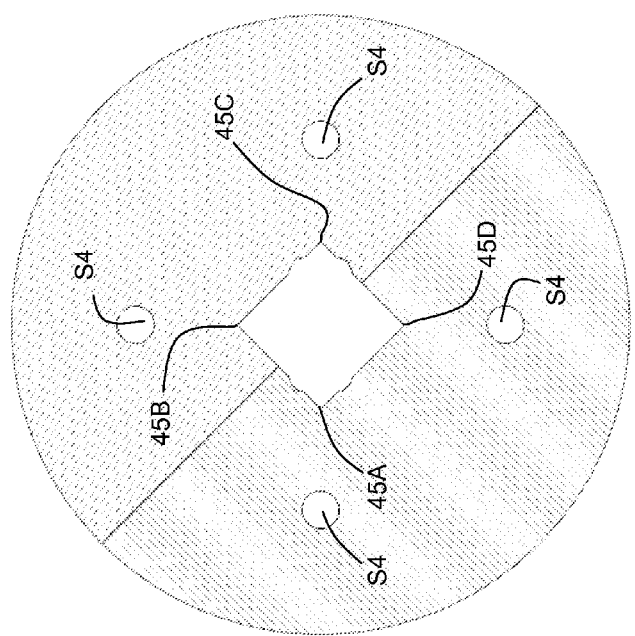
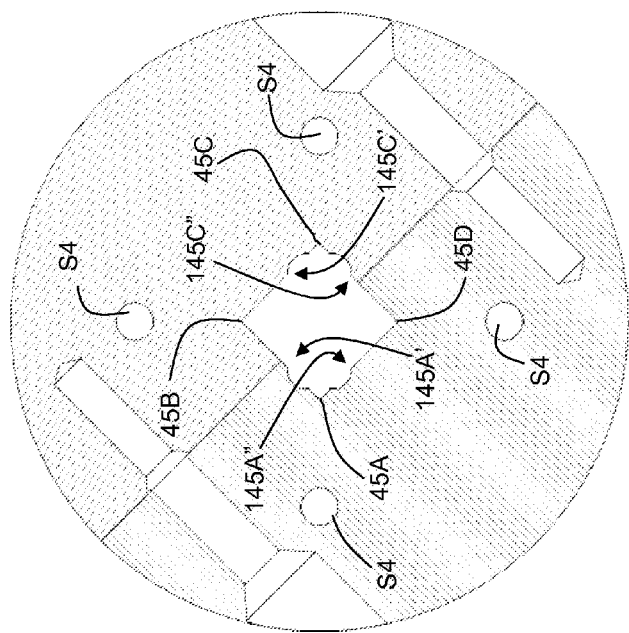

DYNAMIC LANCES UTILIZING FLUIDIC TECHNIQUES

CROSS-REFERENCE TO RELATED APPLICATIONS

None.

BACKGROUND

There are a variety of industrial applications utilizing injection of a jet of gas into a reaction space.

One application is a non-ferrous metallurgical furnace. It is known to provide a layer of liquefied inert gas such as Argon over a bath of molten for the purpose of avoiding the pickup of oxygen from the atmosphere above the bath. The Argon is typically introduced above the bath as a stream of liquefied gas. The liquefied gas pools above the bath and vaporizes to produce an expanding gas which drives out any oxygen above the surface of the bath. Typically, the Argon is introduced above the bath using a fixed lance. While the prior art methods have provided a fairly satisfactory solution, such methods utilizing a fixed lance do not achieve maintenance of a uniform layer of liquefied gas above a large area of the bath while at the same time avoiding overconsumption of the Argon.

Some non-ferrous processes utilize oxygen for refining. An example is the refining of copper. Copper is inert relative to other metals so oxygen and/or air can be used to oxidize dissolved elements. Oxygen and/air can also be used to impart the correct amount of dissolved oxygen for certain applications such as copper rod. Non ferrous baths often have a large surface area that would normally be poorly mixed. A moveable lance would provide more uniform application of oxygen and/or air.

Another application is a furnace, including electric arc furnaces (EAFs). In electric arc furnaces, the materials to be melted are introduced at the top of the furnace. Depending on several parameters as type of raw materials (pig iron or scrap iron or steel), size of the furnace, etc, the EAF may be equipped with burners delivering a power of several megawatts. This combustion of fuel (mainly natural gas but sometimes fuel-oil) with oxygen brings heat to initiate melting of the scrap. The scrap in front of the burners is heated first. The burner must have a high momentum flames for at least a few reasons. First, high momentum flames are needed to avoid the deviation of the flame towards the walls or even towards the burner panel. Second, they are needed to quickly create a cavity in the scrap pile thereby increasing heat transfer efficiency. Third, they are needed to avoid clogging of the injectors by steel droplets once the scrap is melted and transformed into liquid steel (thus, a low power flame is always on).

A cutting operation in the electric arc furnace occurs during the scrap melting phase when the scrap is hot but not molten. In this phase, heat transfer between oxy-fuel burner flame and the scrap is no longer efficient so final melting in the "cold spots" is performed using oxygen and the mechanism of heating is chemical energy provided by the oxygen reacting with the scrap. Cutting is used normally by operating oxy-fuel burners with excess oxygen or by using the door lance through the slag door.

A refining operation in an electric arc furnace deals with the removal of primarily carbon, but also phosphorus, sulfur, aluminum, silicon and manganese from the steel. Typically, refining operations are carried out once the steel scrap is completely melted and involves oxidation of the above mentioned impurities through injection of a supersonic oxygen jet into the molten bath. Removal of carbon impurities is referred to as the decarburization process, a process which occurs in the steel bath and in a slag-gas-steel emulsion after the burner operation is stopped. The refining step in the EAF is also called the "hard lance mode". It includes reactions between C (coal particles and dissolved carbon in the melt), CO, $CO_2$ and $O_2$ which provided by the supersonic lance. The oxidation of carbon generates CO bubbles that can flush from the bath dissolved gases such as hydrogen and nitrogen, which are also recognized as a concern. The injected oxygen also lowers the bath carbon content to the desired level for tapping. Because most of the other non-carbon impurities during refining have a higher affinity for oxygen than carbon, oxygen preferentially reacts with these elements to form oxides which can be removed in the resultant slag.

The location of an EAF tool such as a burner or lance can be described by the distance of the tool from the nominal steel bath surface. The lance is typically located a distance of 0.5 to 2 meters above the steel bath. A foaming slag (CO bubbles), created by the carbon-oxygen reaction during carbon injection, floats on the steel bath. In most EAFs, a burner and a supersonic lance are combined into a single multifunction tool. The implementation of such a tool depends mainly on the furnace type, the composition and quality of the raw materials. The angle of injection (with respect to horizontal) of the supersonic $O_2$ jet is often around 40-45° from the horizontal. However, this value can be as high as 50° and it will depend upon the construction of the furnace. Once installed to a furnace, many supersonic lances for EAFs currently available in the market inject oxygen into the bath at a fixed angle. This fixed angle present several limitations. The fixed location of impact of the supersonic jet locally depletes the carbon content in the impact area. As, a result, FeO generation in the immediate vicinity of the impact point is relatively high. FeO is very corrosive to furnace refractories, so excessive refractory damage at this location is common. Second, due to certain technical constraints, many lances have to be located at a distance higher than optimal above the steel bath surface to achieve the often optimal 40-45° angle of injection. This is because the jet must be tilted more downwardly toward the steel. Third, fixing this angle has the effect of fixing the area of the steel bath surface that is targeted by the supersonic jet. If only a portion of the bath can be stirred by impingement of the jet upon the targeted portion, the overall refining reaction is limited by the relatively slow diffusion of oxygen through the non-targeted/unstirred portions of the bath. Acceleration of the overall refining process thus often requires the use of multiple tools for separately targeting multiple portions of the bath. Fourth, apart from the stirring issue, a fixed angle of attack limits the ability of the lance to generate a thick foamy slag on the bath surface over more than just the targeted area. This is important because quick generation of thick, foamy slag across much of the bath surface decreases the tap-to-tap time and increases furnace productivity. Speedier generation of the thick, foamy slag often requires the use of several lances each one of which targets a specific portion of the bath.

As a result of the fixed angle, most of the existing supersonic lance solutions are concerned with estimating an optimal number of lances and determining their optimal locations. While a more dynamic and adaptive control may be achieved with the use of supersonic lances utilizing moving parts, this approach is not a robust solution for supersonic jets in the very dusty environments of EAFs because the moving parts are exposed to severe thermal, mechanical and chemical attacks.

Similar rationales can be applied to other steelmaking processes such as the Basic Oxygen Furnace (BOF), the top and bottom mixed blowing converter (QBOP), the Argon Oxygen Decarburisation (AOD) process and the Vacuum Oxygen Decarburization (VOD) process.

Thus, there is a need in the art for providing a solution that overcomes the above problems.

SUMMARY

There is provided a method of injecting a jet of a gas into an interior of a reaction space containing a liquid or solid reactant. The method includes the following steps. A lance is provided that comprises a main body having a primary conduit and a secondary conduit formed therein and upstream and downstream ends. A jet of a gas is injected from the outlet of the primary conduit and into the reaction space. A vacuum is applied to the secondary conduit to create a counterflow of a gas into the secondary conduit outlet from the reaction space interior and to cause deviation of the jet towards the counterflow. Each of the primary and secondary conduits extends between a respective inlet and a respective outlet, the outlets being disposed at the downstream end. An outlet of the secondary conduit is disposed at a location adjacent the primary conduit outlet.

There is also provided a system for injecting a jet of a gas into an interior of a reaction space containing a liquid or solid reactant. The system comprises: a lance comprising a main body, a source of a first gas, and a source of vacuum. The main body has a primary conduit and a secondary conduit formed therein and upstream and downstream ends. Each of the primary and secondary conduits extends between a respective inlet and a respective outlet, the outlets being disposed at the downstream end. An outlet of the secondary conduit is disposed at a location adjacent the primary conduit outlet. The source of the first gas is at a pressure higher than ambient and it fluidly communicates with the primary conduit. The source of vacuum is in selective fluid communication with the secondary conduit.

There is provided another method of injecting a jet of a gas into an interior of a reaction space containing a liquid or solid reactant. The method comprises the following steps. A lance is provided comprising a main body having a primary conduit and a secondary conduit formed therein and upstream and downstream ends. A jet of a first gas is injected from the outlet of the primary conduit and into the reaction space. A second gas is injected from the outlet of the secondary conduit to create a co-flow of the second gas adjacent to a peripheral region of the jet such that the jet is deviated towards the co-flow of second gas. The first and second gases are the same or different. Each of the primary and secondary conduits extends between a respective inlet and a respective outlet, the outlets being disposed at the downstream end. An outlet of the secondary conduit is disposed at a location adjacent the primary conduit outlet.

There is provided another system for injecting a jet of a gas into an interior of a reaction space containing a liquid or solid reactant. The system comprises: a lance comprising a main body, a source of a first gas, and a source of a second gas. The main body has a primary conduit and a secondary conduit formed therein and upstream and downstream ends. Each of the primary and secondary conduits extends between a respective inlet and a respective outlet, the outlets being disposed at the downstream end. An outlet of the secondary conduit is disposed at a location adjacent the primary conduit outlet. The source of the first gas is at a higher than ambient pressure and it fluidly communicates with the primary conduit. The source of the second gas is at a higher than ambient pressure and is in selective fluid communication with the secondary conduit. The first and second gases are the same or different. The source of second gas is at a pressure higher than that of the source of the first gas.

There is also provided a lance for injecting a jet of a first gas into an interior of a reaction space. The lance comprises: a main body having upstream and downstream ends and primary and secondary conduits formed therein; and a collar comprising a wall extending around the primary and secondary conduit outlets from the main body downstream end. Each of the primary and secondary conduits extends between an associated inlet and an associated outlet, each of the primary and secondary conduit outlets being disposed at the downstream end. A terminal portion of the primary conduit at the downstream end extends along an axis. The primary conduit inlet is adapted to be placed in fluid communication with a source of a first gas. The secondary conduit inlet is adapted to be placed in fluid communication with a source of vacuum or a source of a second gas. An inner surface of the collar wall diverges away from the primary conduit axis to define a vectoring space adapted to allow expansion of a jet of the first gas exiting the primary conduit outlet. The source of the first gas is the same as or different from the source of the second gas. The secondary conduit outlet is disposed at a location adjacent the primary conduit outlet sufficient to fluidically deviate a jet of the first gas exiting the primary conduit outlet towards the collar inner wall surface adjacent the secondary conduit outlet when the secondary conduit inlet is placed in fluid communication with either the vacuum source or the source of the second gas.

Any of the disclosed methods, systems, or lance may include one or more of the following aspects:

- the jet has a velocity with a Mach number in a range of from 0.3 to 5.0.
- the jetted gas is oxygen.
- the jetted gas is oxygen-enriched air.
- the jet is deviated by an angle $\theta$ with respect to the axis and $\theta$ is in the range of $0°<\theta \leq 45°$.
- said application of vacuum is discontinued such that the jet is no longer deviated towards the counterflow.
- said steps of applying and discontinuing application of the vacuum are alternated such that the jet is swept along an area described by an angle $\theta$ in the range of $0°<\theta \leq 45°$.
- the lance has a plurality of secondary conduits each one of which extends between a respective inlet and a respective outlet, each of the secondary conduit outlets being disposed at the downstream end, wherein application of vacuum is alternated between the plurality of secondary conduits to alternatingly deviate the jet towards different ones of the plurality of secondary conduits.
- alternating application of the vacuum between two of the secondary conduits has the effect of sweeping the jet over an angular deviation of from about −45° to about +45°.
- the jet is supersonic.
- the jet has a flow rate of 200 Nm$^3$/h to 4000 Nm$^3$/h.
- a ratio of the static pressure of the counterflow to the static pressure of the jet at the primary and secondary conduit outlets is in a range of from 0.01 to less than 1.00.
- the lance further comprises a collar extending from the downstream end of the main body, the collar having a wall extending around the primary and secondary conduit outlets, an inner surface of the wall defining a vectoring space, wherein the jet attaches to the inner surface adjacent the secondary outlet when the vacuum is applied thereto.
- the lance has n secondary conduits each one of which extends between a respective inlet and a respective outlet, each of the secondary conduit outlets being disposed at the downstream end, wherein application of vacuum is alternated between the n secondary conduits to alternatingly deviate the jet between a respective n counter-flows and n is an integer in the range of from 2-6.

the jet is swept across a straight line-shaped target area.

the jet is swept across a triangular target area.

the jet is swept across a quadrilateral target area.

the reaction space is an electric arc furnace.

the reaction space is a molten bath of non-ferrous metal.

the source of the vacuum is selected from a vacuum pump, an ejector pump, and a diverging portion of a converging-diverging nozzle.

the jet is ideally expanded.

the jet is under-expanded.

the reaction space is a Basic Oxygen Furnace (BOF) or a top and bottom mixed blown (QBOP) converter the reaction space is an Argon Oxygen Decarburization (AOD) furnace the reaction space is a Vacuum Oxygen Decarburization (VOD) furnace the lance has a plurality of secondary conduits each one of which extends between a respective inlet and a respective outlet, each of the plurality of secondary conduit outlets being disposed at the downstream end, wherein the vacuum is applied to one of the plurality of secondary conduits and either a positive flow or no flow of a gas is simultaneously allowed through another of the plurality of secondary conduits.

the jet has a circular cross-section.

the lance further comprises a collar extending from the downstream end of the main body, the collar having a wall extending around the primary and secondary conduit outlets, an inner surface of the wall defining a vectoring space through which a jet of the first gas may be injected from the outlet of the primary conduit.

the reaction space is a molten matte of sulfides of non-ferrous metals.

the first gas is the same as the second gas and the first and second gases are at different pressures upstream of the lance.

said injection of the second gas from the secondary conduit is discontinued wherein the jet is no longer deviated towards the co-flow.

said steps of applying and discontinuing are alternated such that the jet is swept along an area described by an angle θ in the range of 0°<θ≦45°.

the lance has a plurality of secondary conduits each one of which extends between a respective inlet and a respective outlet, each of the secondary conduit outlets being disposed at the downstream end, wherein injection of the second gas is alternated between the plurality of secondary conduits to provide an alternating plurality of co-flows and to alternatingly deviate the jet towards different ones of the plurality of co-flows.

alternating injection of the second gas between two of the secondary conduits has the effect of deviating the jet across a total angle of greater than 0° and equal to or less than 90°.

the lance further comprises a collar extending from the downstream end of the main body, the collar having a wall extending around the primary and secondary conduit outlets, an inner surface of the wall defining a vectoring space, wherein the jet becomes fixed with respect to the inner surface adjacent the secondary conduit outlet when injection of the second gas is initiated therethrough.

the wall has a height in the direction of the jet flow that is 1-5 times the width or diameter of the jet.

the lance has n secondary conduits each one of which extends between a respective inlet and a respective outlet, each of the secondary conduit outlets being disposed at the downstream end, wherein injection of the second gas is alternated between the n secondary conduits to alternatively deviate the jet between a respective n co-flows and n is an integer in the range of from 2-6.

the primary conduit comprises a converging-diverging nozzle that extends along an axis.

a cross-section of the collar wall inner surface taken along the primary conduit axis has an ellipsoid configuration having first and second ends, wherein the lance comprises an additional secondary conduit formed in the main body that extends between a respective inlet and a respective outlet that is disposed at the main body downstream end, each of two secondary conduit outlets being disposed adjacent one of the first and second ends of the ellipsoidally configured collar wall inner surface.

a cross-section of the collar wall inner surface taken along the axis has a three-lobed configuration each lobe of which terminates in a tip, wherein the lance comprises two additional secondary conduits each of which is formed in the main body and extends between a respective inlet and a respective outlet that is disposed at the downstream end, each of the three secondary conduit outlets being disposed adjacent a respective one of the three tips.

a cross-section of the collar wall inner surface taken along the axis has a triangular configuration with three corners, wherein the lance comprises two additional secondary conduits each of which is formed in the main body and extends between a respective inlet and a respective outlet disposed at the downstream end, each of the three secondary conduit outlets being disposed adjacent to a respective one of the three corners.

the corners are rounded off.

a cross-section of the collar wall inner surface taken along the axis has a four-lobed configuration each lobe of which terminates in a tip, wherein the lance comprises three additional secondary conduits each of which is formed in the main body and extends between a respective inlet and a respective outlet disposed at the downstream end, each of the four secondary conduit outlets being disposed adjacent a respective one of the four tips.

a cross-section of the collar wall inner surface taken along the axis has a parallelogram configuration having four corners, wherein the lance comprises three additional secondary conduits each of which is formed in the main body and extends between a respective inlet and a respective outlet disposed at the downstream end, each of the four secondary conduit outlets being disposed adjacent to a respective one of the four corners.

the collar wall inner surface has at least two pairs of grooves formed therein, each groove of one of the pairs extending in a direction parallel to the primary conduit axis from opposite sides of a respective one of the four corners.

a cross-section of the secondary conduit outlet taken along the primary conduit axis has a kidney bean configuration, wherein the primary conduit outlet has a circular cross-section taken along the primary conduit axis and the concave portion of the kidney bean configuration extends coaxially with and along a peripheral portion of the primary conduit outlet.

an inner surface of the wall has a circular cross-section taken along the primary conduit axis, wherein:
  a plurality of dividers extend inwardly from the inner wall surface towards the primary conduit axis to define a respective plurality of expansion zones disposed between adjacent dividers; and
  the lance has a plurality of the secondary conduits each one of which extends between a respective inlet and a respective outlet disposed at the main body downstream end, each of the plurality of secondary conduit outlets being associated with a respective one of the plurality of expansion zones and disposed immediately upstream thereof.
the plurality of vectoring spaces consists of n expansion zones, the plurality of secondary conduits consists of n secondary conduits, and n is an integer in the range of from 2-6.
a width or diameter of the secondary conduit outlet is between 0.01 to 2.0 times a width or diameter of the primary conduit outlet.
the collar has a height H extending from a plane including the primary conduit outlet and a terminal downstream portion of the collar, H being one to ten times the width or diameter of the primary conduit.
the collar inner wall surface diverges in straight-line fashion away from the primary conduit outlet.
the collar inner wall surface diverges in curved-line fashion away from the primary conduit outlet.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

FIG. 2A is a isometric view of a lance whose jet may be deviated between opposite sides of an ellipsoid collar wall.

FIG. 2C is an expanded section of the top view of FIG. 2A.

FIG. 5A is a top view of a lance whose jet may be deviated between different lobes of a tri-lobed collar wall.

FIG. 5B is an expanded section of the top view of FIG. 5A.

FIG. 12B is an expanded section of the exploded, isometric view of FIG. 12A.

FIG. 13B is an expanded section of the top view of FIG. 13A.

FIG. 14A is a side elevation view of the lance of FIGS. 10, 11, 12A-12B, and 13A-13B.

FIG. 14D is a cross-sectional view of the lance of FIG. 14A taken along line D-D.

FIG. 14E is a cross-sectional view of the lance of FIG. 14A taken along line E-E.

DESCRIPTION OF PREFERRED EMBODIMENTS

Figure 1A:
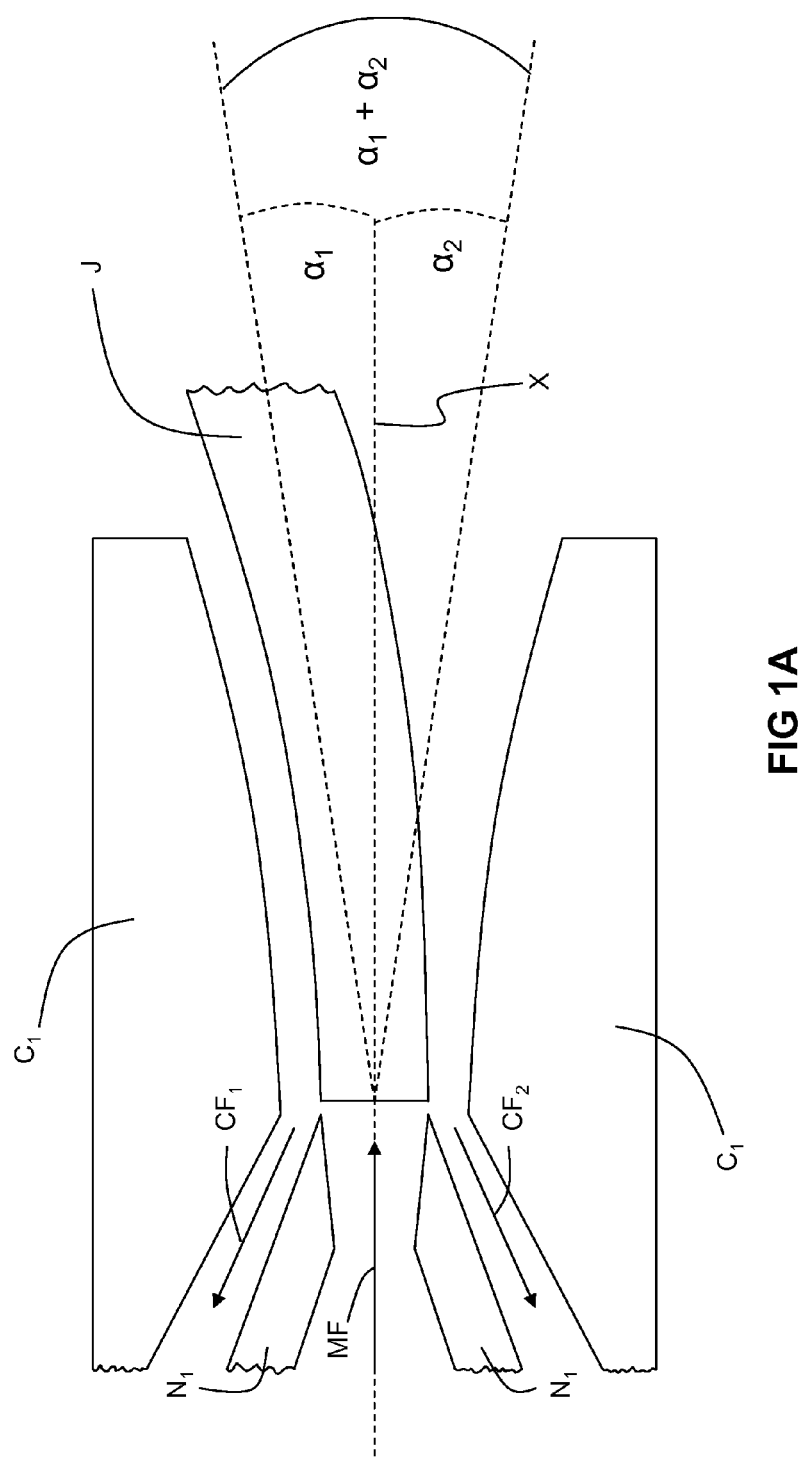
FIG. 1A is a schematic cross-sectional view of a counterflow embodiment of the invention.

The invention is directed to a lance, lancing systems, and methods for injecting a gaseous substance into a reaction space wherein fluidic techniques are utilized to deviate a jet of gaseous substance in a desired direction.

A lance used according to the method includes a main body having upstream and downstream ends and a primary conduit formed therein and at least one secondary conduit formed therein. Each of the primary and secondary conduits extend between an associated inlet and an associated outlet each of which is disposed at the downstream end of the main body. The primary conduit inlet is adapted to be placed in fluid communication with a source of a first gas. The secondary conduit inlet is adapted to be placed in fluid communication with either a source of vacuum or a source of a second gas. The lance may optionally include a collar. The collar includes a wall extending around the primary and secondary conduit outlets from the main body downstream end. An inner surface of the wall defines a vectoring space adapted to allow a jet of the first gas exiting the primary conduit outlet to flow therethrough. The source of the first gas may be the same as or different from the source of the second gas. The secondary conduit outlet is disposed at a location adjacent the primary conduit outlet sufficient to fluidically deviate a jet of the first gas exiting the primary conduit outlet towards the collar inner wall surface adjacent the secondary conduit outlet when the secondary conduit inlet is placed in fluid communication with either the vacuum source or the source of the second gas.

A counter-flow embodiment of a method according to the invention includes the following steps. A jet of the first gas is injected from the outlet of the primary conduit and into the reaction space. A vacuum is applied to the secondary conduit to create a counterflow of a gas into the secondary conduit outlet from the reaction space interior and the jet is deviated towards the counterflow. Without being bound by any particular theory, we believe that a difference in static pressure between the jet and the counterflow at the outlets causes deviation of the jet towards the co-flow of second gas.

A co-flow embodiment of a method according to the invention includes the following steps. A jet of the first gas is injected from the outlet of the primary conduit and into the reaction space. A second gas is injected from the outlet of the secondary conduit to create a co-flow of the second gas parallel to an axis of the jet and adjacent a peripheral region of the jet. The jet is deviated towards the co-flow of second gas.

In the co-flow embodiment, the co-flow itself is overexpanded. The first and second gases may be the same or different. The axis along which the secondary conduit is oriented may be parallel or at an angle to an axis along which the primary conduit is oriented. In the latter case, the two axes diverge as they proceed from an upstream direction to a downstream direction. In this manner, the secondary conduit is not oriented towards the primary conduit so as to cause direct impingement of the co-flow upon the jet and momentum transfer.

The jet angle may be controlled by using a secondary flow (co-flow or counterflow) that is adjacent to the jet whereby the ratio of the static pressure of the secondary flow to that of the jet at the outlets is less than 1. Without being bound by any particular theory, we believe that, due to the difference in static pressures between the jet and the secondary flow, the jet is deviated or "bent" towards the secondary flow. For ideally expanded jets, this means that the static pressure of the secondary flow is sub atmospheric. The ratio may be achieved in two different ways: with a secondary flow that flows in a direction opposite that of the jet (counterflow) or with a secondary flow that flows in the same direction as that of the jet (co-flow). Regardless of whether the counterflow or co-flow alternatives are used, use of this technique allows continuous deviating or bending (i.e., vectoring) of the jet from zero to a maximum deviation angle.

A description of the theorized mechanism now follows with reference to two non-limiting examples.

A counterflow embodiment of this vectoring is illustrated in FIG. 1A. A main flow MF of a first gas flows through a primary conduit that extends through a main body of a lance and whose terminal portion includes nozzle $N_1$. The main flow MF exits the nozzle $N_1$ along an axis X and emerges as a jet J. A secondary conduit also extends through the lance in between the nozzle $N_1$ and the collar $C_1$. If a vacuum is applied to produce a first counterflow $CF_1$ in the secondary conduit, the jet J is vectored/deviated by an angle $\alpha_1$ away from the axis X and towards one side of the collar $C_1$. The lance includes another secondary conduit also extending between the nozzle $N_1$ and the collar $C_1$ on a side of the jet J opposite that of the first counterflow $F_1$. If the vacuum is instead applied to produce a second counterflow $CF_2$ in this other secondary conduit, the jet J is vectored/deviated by an angle $\alpha_2$ away from the axis X and towards the opposite side of the collar $C_1$. Thus, if the vacuum is alternatingly applied to opposite areas adjacent the jet J to produce alternation between counterflow $F_1$ and counterflow $F_2$, the total angle by which the jet J is deviated by the alternating counterflows $F_1$, $F_2$ is the sum of the individual angles $\alpha_1+\alpha_2$ and the jet J is swept across a target area generally described by a straight line.

In the counterflow embodiment, the vacuum may be supplied by an external vacuum pump fluidly communicating with the secondary conduit through which the counterflow is desired. Alternatively, the vacuum may be supplied with an external ejector pump using compressed gas. One of ordinary skill in the art will recognize that such an ejector pump directs compressed gas (such as air) through a converging-diverging nozzle. An opening in the nozzle is disposed in the diverging portion of the ejector pump adjacent the nozzle's neck. This opening fluidly communicates with the secondary conduit in the lance. The vacuum may instead be supplied by another lance in which case the primary conduit in the other lance is a converging-diverging nozzle. In this manner, a lance utilizing counterflow is supplied with vacuum from another lance associated with the reaction space and which is operated without counterflow. This other lance may be identical to the lance of FIG. 1A and operable according to the invention or it may be different.

Figure 1B:
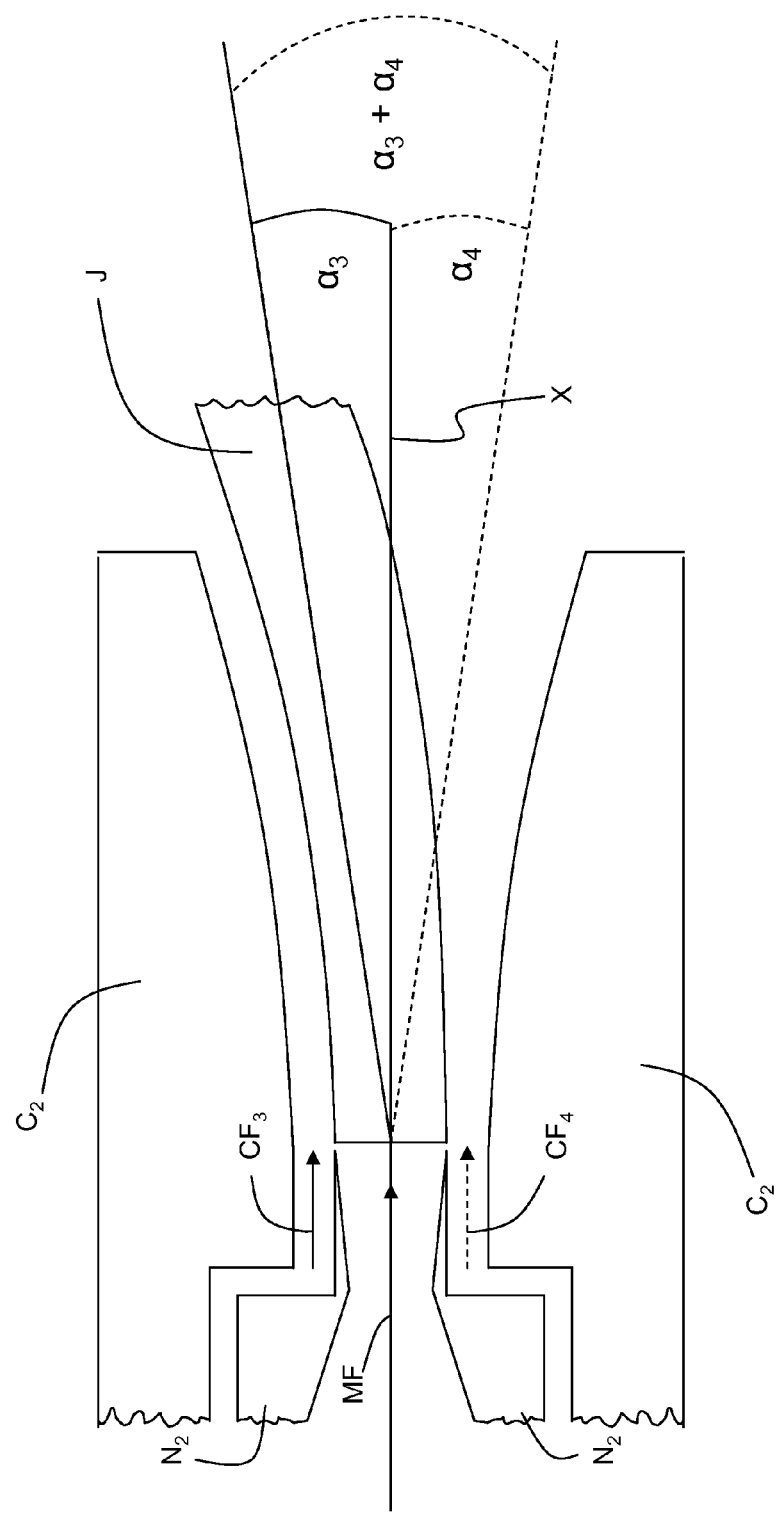
FIG. 1B is a schematic cross-sectional view of a co-flow embodiment of the invention.

A co-flow embodiment of this vectoring is illustrated in FIG. 1B. A main flow MF of the first gas flows through a primary conduit that extends through a main body of a lance and whose terminal portion includes nozzle $N_2$. The main flow MF exits the nozzle $N_2$ along an axis X and emerges as a jet J. The lance also includes two secondary conduits each one of which extends through a different portion of the lance between the nozzle $N_2$ and the collar $C_2$. A co-flow $CF_3$ of a second gas (which may the same as or different from the first gas) emerges from one of the secondary conduits. One of ordinary skill in the art will recognize that the static pressure of the co-flow $CF_3$ and of the jet J is a function of the upstream pressure of the supply of the gases for the co-flow $CF_3$ and the jet J and also of the geometrical configuration of the nozzle $N_2$ and collar $C_2$. Thus, the pressures of the gases upstream of the nozzle $N_2$ for each of the jet J and co-flow $CF_3$ and the configuration of the nozzle $N_2$ are selected such that the static pressure of the co-flow $CF_3$ adjacent the jet J is lower than of the main jet J. Based upon a given nozzle configuration, if insufficient deviation of the jet J is observed, an operator simply may increase the upstream pressure of the second gas for co-flow $CF_3$ in an empirical manner until a sufficient deviation by an angle $\alpha_3$ away from the axis X and towards the co-flow $CF_3$ is observed. If deviation of the jet J in the opposite direction is desired, co-flow $CF_3$ is discontinued and a co-flow $CF_4$ of the second gas is initiated through the other of the secondary conduits on an opposite side of the jet J. The pressures of the gases upstream of the nozzle $N_2$ for each of the jet J and co-flow $CF_4$ and the configuration of the nozzle $N_2$ are selected such that the static pressure of the co-flow $CF_4$ adjacent the main jet J is lower than of the jet J. Again, based upon a given nozzle configuration, if insufficient deviation of the jet J is observed, an operator may simply increase the upstream pressure of the gaseous substance for co-flow $CF_4$ in an empirical manner until a sufficient deviation by an angle $\alpha_4$ is observed. Thus, if the co-flows $CF_3$ and $CF_4$ are alternated, the total angle by which the jet J is deviated by the alternating co-flows $F_3$, $F_4$ is the sum of the individual angles $\alpha_3+\alpha_4$ and the jet J is swept across a target area generally described by a straight line.

It is believed that each single deviation angle may reach as high as 45°. For reaction spaces that are enclosed by a structure (such as furnace refractory), angles beyond 45° may cause the jet to reach too close to the enclosed structure may cause significant damage thereto.

While each of FIGS. 1A and 1B illustrate specific configurations, such configurations are not essential to the invention. Rather, the lance need only have a primary conduit through which the first gas flows and a secondary conduit through which flows either the counterflow or the co-flow. While a collar is not essential to the invention, use of a collar brings some benefits. In the counterflow embodiment, the collar serves as a surface against which the jet may attach by the Coanda effect. Thus, the deviation of the jet is rendered more accurate and repeatable. Also, the collar serves to lower the degree of vacuum required in comparison to when no collar is used. When no collar is used, a relatively higher degree of vacuum is needed because not only is the jet drawn towards the area of lower static pressure associated with the counterflow, furnaces gases on other sides of the jet tend to be drawn towards the low static pressure area as well. Thus, part of the vacuum is "consumed" by such drawing in. In contrast, when a collar is used, no or less of such drawing in of furnace gases occurs. In the co-flow mode, the collar serves to establish a more pronounced differential static pressure between the co-flow and the jet. When the co-flow is not bounded on one side by a collar, the co-flow entrains surrounding furnace gases that tend to decrease the velocity of the co-flow and diffuse the static pressure. When the co-flow is bounded by the collar, little of such entrainment occurs, so the velocity is much easier to maintain. In other words, a higher upstream pressure is needed for the co-flow to achieve a given velocity and static pressure when no collar is used in comparison to when a collar is used.

The utilization of moving parts at location can render those parts susceptible to corrosion or thermal damage from the heat or gases from the reaction space. Nevertheless, the collar may be of rotating type. This means that the collar may have an outer plate having one or more openings for the counterflow or co-flow that is rotatable with respect to the rest of the lance. In this manner, rotation of the outer plate may allow a counterflow or co-flow adjacent one region of the jet while disallowing such a counterflow or co-flow at another region of the jet. Further rotation of the outer plate may disallow the first counterflow or co-flow while allowing the second counterflow or co-flow.

The collar is a structure that extends from a main body of the lance adjacent the primary and secondary conduit outlets to a downstream extremity of the lance. The collar includes a wall that extends around the outlets of the primary conduit (from which the jet emanates) and the outlet(s) of the secondary conduit(s). The inner surface of the wall defines a vectoring space and provides a surface upon which the jet may attach given sufficient deviation by the fluidic means of the counterflow or co-flow. While the wall may partially surround the outlets, it is believed that better performance is realized when the wall completely surrounds the outlets.

In the co-flow embodiment, one of ordinary skill in the art will recognize that the jet will not attach per se, but instead becomes fixed with respect to the surface. Thus, throughout the Specification the word "attach" is used to denote that that the jet becomes fixed with respect to the surface whether or not it actually touches the surface. This applies to both the co-flow and counterflow embodiments.

The inner wall surface may be configured in a variety of shapes. For example, a cross-sectional shape of the inner wall surface may be a circle, ellipse, square, triangle, tri-lobed, four-lobed, five-lobed, six-lobed, a pentagon, or a hexagon. Regular polygons with more than six sides are also included within the scope of the invention but are somewhat less preferred because of the relatively greater difficulty in attaching the jet to a particular side. The inner wall surface may also include dividers that extend inwardly towards the jet. These dividers serve the purpose of partially dividing the space enclosed by the inner wall surface into a plurality of vectoring sub-spaces. Each of the plurality of vectoring sub-spaces is associated with a respective secondary conduit outlet allowing a respective counterflows or co-flow therethrough. The dividers should not be overly long such that their innermost edges interfere with the jet. Instead of dividers, the plurality of vectoring sub-spaces may be separated by a plurality of gas curtains.

In the case where no dividers are used with the collar, the vectoring space may still be divided into a plurality of vectoring sub-spaces. This may be accomplished by selecting a collar wall inner surface configuration whose cross-section along the axis of the primary conduit is different from that of the primary conduit outlet. For example, if the primary conduit outlet has a circular cross-sectional shape, while the collar wall inner surface could have an ellipsoid, square, triangular, tri-lobed, four-lobed, five-lobed, six-lobed, pentagonal, or hexagonal cross-sectional shape. The primary conduit outlet and collar wall inner surface configurations and relative sizes are selected such that the peripheral regions of the jet touch the collar inner wall surface at a plurality of tangency points. In a first particular example, a properly sized primary conduit outlet and triangular collar wall inner surface will yield a centrally disposed circular area accommodating the jet as well as three vectoring sub-spaces. In this particular example, each of the vectoring sub-spaces is defined by a portion of one of the corners of the triangle and an arc that extends along a partial circumference of the jet. In a second particular example, the primary conduit outlet could have a square cross-sectional shape and the collar inner wall surface could have a circular cross-section. A properly sized primary conduit and a properly sized collar inner wall will yield a centrally disposed square area accommodating the jet as well as four circular segments. Each of the circular segments would have an outer boundary consisting of an arc and an inner boundary consisting of a chord that extends along one of the sides of the jet. Several others of these combinations of primary conduit outlet and collar inner wall surface configurations are possible, including but not limited to:

a circular primary conduit outlet and a square, pentagonal, hexagonal, tri-lobed, or four-lobed collar wall inner surface;

a circular collar wall inner surface and a triangular, square, pentagonal, hexagonal, tri-lobed or four-lobed primary conduit outlet.

For ease of machining, the first group of combinations is preferred.

The collar inner wall surface can extend parallel to the axis of the primary conduit. Alternatively, the collar wall inner surface can and preferably does diverge outwardly away from the primary conduit axis. In such a case, the divergence may take any of several configurations, two of which will now be described As best illustrated by FIG. 1C, a collar $C_3$ has a wall portion with a height $H_3$ that extends downstream from an outlet of the primary conduit $N_3$ from which the jet $J_3$ originates. The height of the inner collar wall is typically between about one to five times the width or diameter $D_3$ of the nozzle $N_3$ or jet $J_3$. A gap $G_3$ between the nozzle $N_3$ and the collar $C_3$ at the outlet of the nozzle $N_3$ (representing the width or diameter of the counterflow or co-flow) is typically anywhere between 0.01 to 2.0 times the width/diameter $D_3$ of the nozzle $N_3$ or jet $J_3$. The inner wall surface $IW_3$ smoothly diverges concavely away from an axis $X_3$ of the nozzle $N_3$ (which also corresponds to an axis of the jet $J_3$ when it is not deviated according to the invention).

Figure 1D:
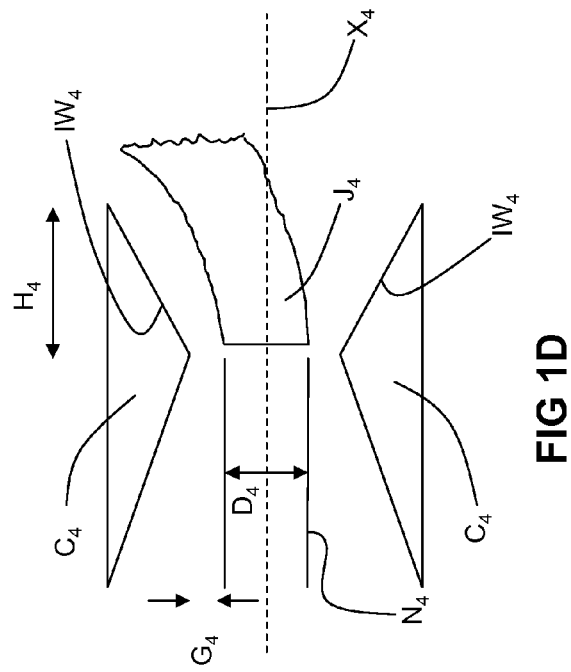
FIG. 1D is a schematic cross-section of a collar having an inner wall surface that diverges in a straight line away from the axis of the jet.
Figure 1C:
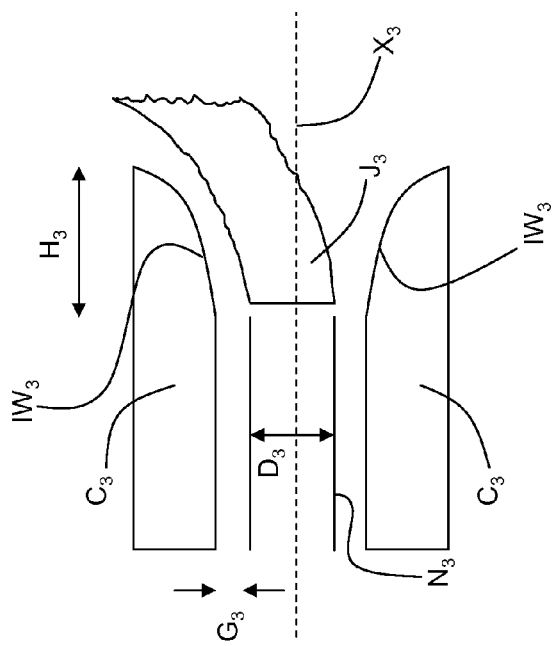
FIG. 1C is a schematic cross-section of a collar having an inner wall surface that diverges concavely away from the axis of the jet.
Figure 2B:
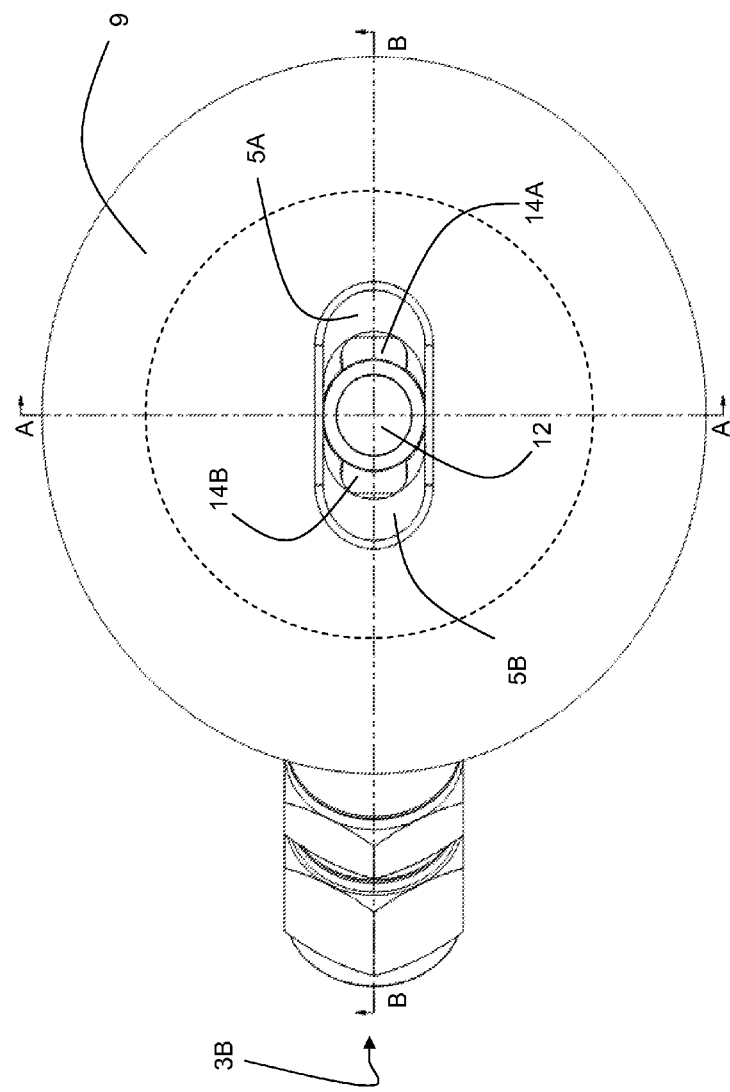
FIG. 2B is a top view of the lance of FIG. 2A.
Figure 3:
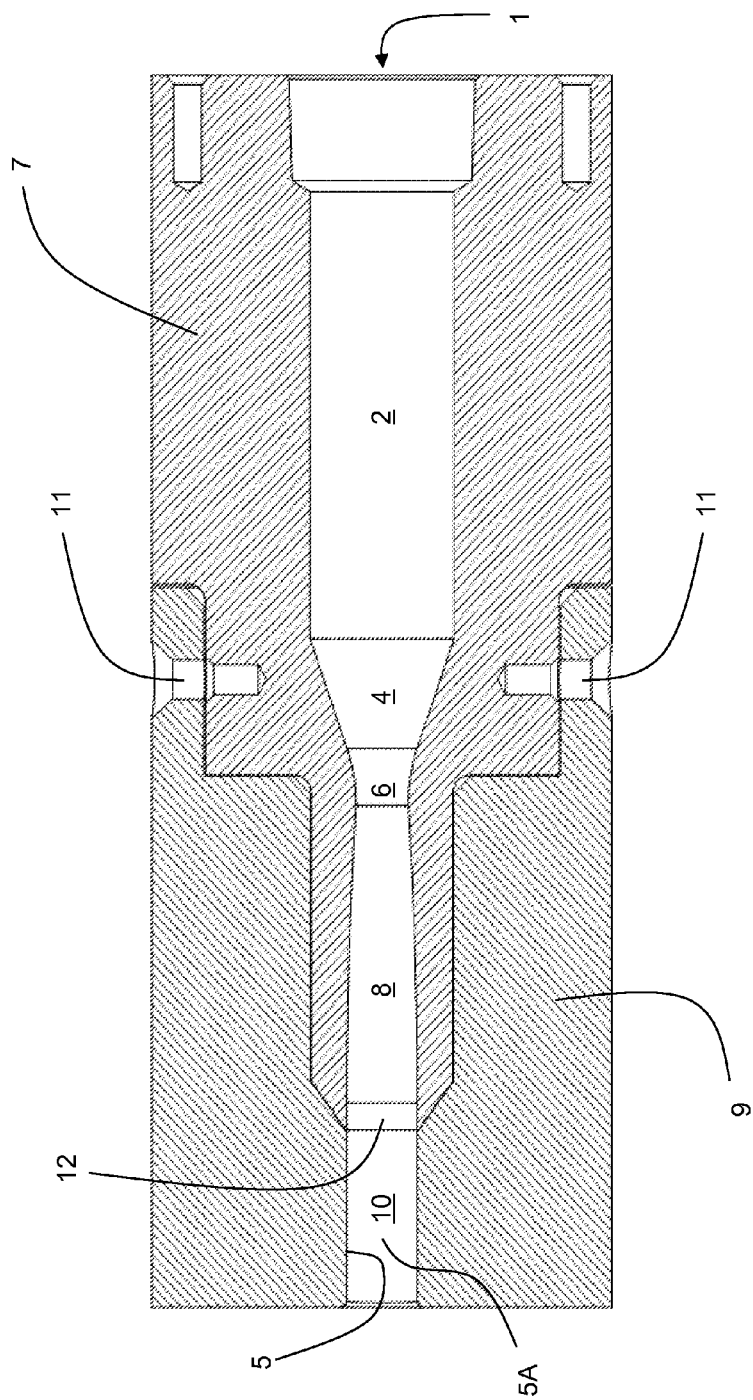
FIG. 3 is a cross-sectional view of the lance of FIGS. 1, 2A, and 2B taken along line A-A.
Figure 4:
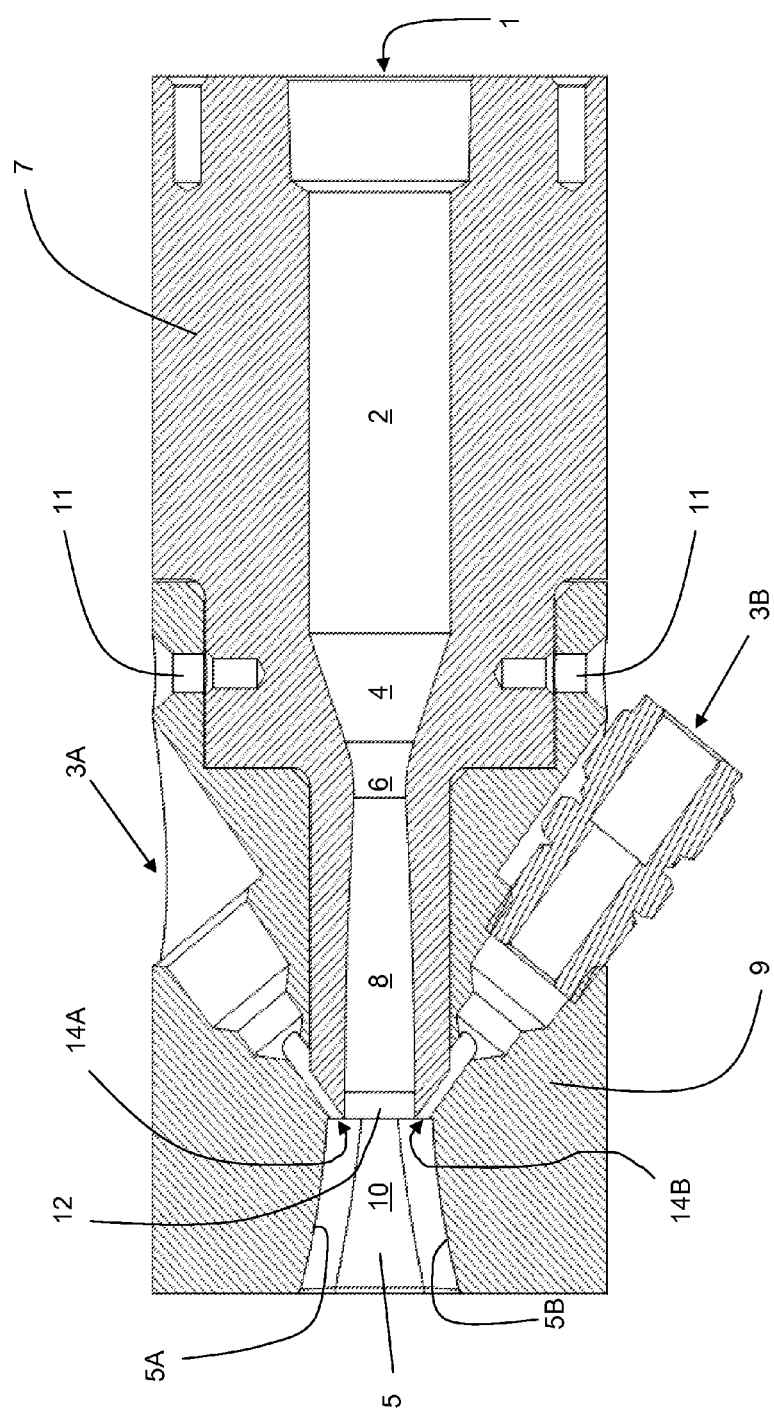
FIG. 4 is a cross-sectional view of the lance of FIGS. 1, 2A, 2B, and 3 taken along line B-B.

As best illustrated by FIG. 1D, a collar $C_4$ has a wall portion with a height $H_4$ that extends downstream from an outlet of the primary conduit $N_3$ from which the jet $J_4$ originates. The height of the inner collar wall is typically between about one to five times the width or diameter $D_4$ of the nozzle $N_4$ or jet $J_4$. A gap $G_4$ between the nozzle $N_4$ and the collar $C_4$ at the outlet of the nozzle $N_4$ (representing the width or diameter of the counterflow or co-flow) is typically anywhere between 0.01 to 2.0 times the width/diameter $D_4$ of nozzle $N_4$ or jet $J_4$. The inner wall surface $IW_4$ diverges in a straight line away from an axis $X_4$ of the nozzle $N_4$ (which also corresponds to an axis of the jet $J_4$ when it is not deviated according to the invention).

The invention may be practiced with the collars of FIGS. 1C and 1D in either the co-flow or the counterflow embodiments.

Regardless of whether co-flow or counterflow is utilized, the collar of course provides a maximum limit to which the jet may be deviated. Under conditions where the jet has not been deviated sufficiently to attach it to the collar, increasing the static pressure ratio between the jet and the co-flow or counterflow will further deviate the jet until it attaches. Once it attaches, further increases in the static pressure ratio between the jet and the co-flow or counterflow will have no further effect upon the jet deviation angle so long as the nozzle, Mach number and flow rates remain constant. However, the maximum deviation angle can be varied by modifying the nozzle design, and when a collar is utilized, the collar design. Under conditions where the jet has not already reached its maximum deviation limit due to the nozzle or collar design, the maximum deviation angle can also be varied by changing the Mach number or by changing the flow rate of the primary jet (by increasing its upstream pressure), or in the case of the counterflow embodiment the level of vacuum may be increased.

Depending upon where one desires to inject the first gas with the lance, many different lancing patterns and corresponding lance configurations may be imagined. If several different openings are provided in the lance adjacent the primary conduit for the jet, several different counterflows or co-flows are possible. While the jet is typically deviated through the fluidic action of only one counterflow or co-flow, the combined action or two or more counterflows and/or co-flows at different peripheral regions of the jet may instead be used. Indeed, a counterflow may be applied to the desired region of deviation while no flow or a positive flow (at relatively low pressures/flow rates) of the first gas may be allowed at other regions. In another configuration, a co-flow may be applied to the desired region of deviation while other openings are kept open. Similarly other openings could be blocked for preventing any flow therethrough.

The invention also allows dynamic control of the lance. In the counterflow mode, varying the degree of vacuum applied to create the counterflow can result in deviation of the jet to any angle in between zero and the maximum angle without requiring reconfiguration of the lance. Additionally, alternation between two different counterflows or co-flows on different sides of the jet will result in alternating vectoring of the jet in different directions. Thus, the jet may be swept across a desired target area instead of being directed towards only one spot. Because this is done fluidically, there is no need for moving parts susceptible to corrosion from the high temperature of and/or gases from the furnace. Rather, alternation between the two counterflows or co-flows may be achieved by remotely alternating application of a vacuum or high pressure second gas to different conduits that are in fluid communication with the secondary conduit outlets. In one aspect of the invention, the vectoring of the jet may follow a pattern in which case the alternation between the various counterflows or co-flows may be controlled with a programmable logic controller.

Typically, the jet is typically vectored in anywhere between 1 to 6 different directions. In other words, the jet is typically deviated from the axis extending from the primary conduit outlet towards 1 to 6 different directions. However, a greater number of vectoring directions is possible with the caveat that relatively less accurate deviations of the jet are believed to occur with such high numbers of vectoring directions. In the case of a square or rectangular jet, it may be vectored in 1 to 4 directions: top, bottom, left, and right. A circular jet may be vectored in any number of directions depending upon the placement and number of secondary conduit outlets. The jet may be swept in any number of different ways: horizontally, vertically, diagonally, etc. The jet may be swept in a repeated pattern or be swept in an irregular manner. Such repeated or irregular sweeping may be controlled with the use of a programmable logic controller written with an algorithm adapted to control application of the counterflow or co-flow to the appropriate secondary conduit for accomplishing the desired sweep conditions.

The jet may be of any gas (the first gas) desired for injection into a reaction space including, but are not limited to, oxygen, oxygen-enriched air, natural gas and inert gases such as nitrogen or argon. In the case of oxygen, it typically has a purity of from 90-100%. In the co-flow embodiment, the second gas may be the same as the first gas or different. Typically, the second gas is the same as the first gas, but at a higher pressure. Also, the co-flow can be at ambient temperature (also called "cold") or preheated. Preheating decreases the mixing rate between the jet and the co-flow.

The velocity of the jet may be supersonic or subsonic, typically in the range of from about 0.3 Mach to about 5.0 Mach. The flow rate of the jet is typically anywhere between about 200 $Nm^3/h$ to about 4000 $Nm^3/h$ while the co-flow is typically about 50 Nm3/h to about 1200 $Nm^3/h$. The width or diameter of the co-flow is typically 0.01 to about 2.0 times the width or diameter of jet. When the invention is applied to metal refining applications in larger vessels (such as a basic oxygen furnace), the flow rate can be much higher (for example 10,000 $Nm^3/h$). In the case of supersonic jets, they can be ideally expanded or under-expanded.

Types of reaction spaces receiving the injected first gas include, but are not limited to, EAFs, BOFs, QBOP, AODs, VODs, and non-ferrous foundries. The reactant in the reaction space is a liquid or a solid and includes, but is not limited to, steel, metal parts, and non-ferrous metals.

Lances

Many different types of lances are included within the scope of the invention. The primary conduit outlet may have a square, rectangular, elliptical, circular, triangular, pentagonal, or hexagonal cross-section. For ease of manufacture, the primary conduit and primary conduit outlet preferably have a circular or square cross-section. The lance also includes at least one secondary conduit (typically one to six but sometimes more. While the cross-section of the secondary conduit outlet may have any configuration, in the counterflow mode the secondary conduit outlet is preferably kidney bean shaped when the primary conduit outlet is circular. In such a case, the concave portion of the kidney bean shape extends along a peripheral region of the primary conduit outlet. This arrangement is believed to achieve the lowest pressure drop across the vacuum conduit in comparison to secondary conduit outlets of different configurations. The lance can have water cooling jackets around it in order to protect them from relatively high temperatures that may be encountered in a reaction space comprising a furnace.

While the lance used according to the invention may have a wide variety of configurations, descriptions of typical examples now follow.

As best illustrated in FIGS. 2A, 2B, 2C, 3, and 4, one lance embodiment includes a collar 9 secured to a main body 7 with fasteners inserted through bores 11. A converging-diverging primary conduit is formed in a main body 7. The primary conduit extends between an inlet 1 and outlet 12 and includes a straight section 2, a converging section 4 which narrows to a neck 6, and a diverging section 8 which extends along an axis. Two secondary conduits are formed in the collar 9. The first secondary conduit extends between an inlet 3A and an outlet 14A, while the second secondary conduit extends between an inlet 3B and an outlet 14B. While FIGS. 2A, 2B, 2C, 3, and 4 illustrate secondary conduits having a stepped and somewhat axially asymmetric shape, the secondary conduits may be configured more symmetrically and may extend parallel the primary conduit. This latter alternative is more typically opted for when the co-flow embodiment is being practiced. The collar 9 includes a wall that circumferentially extends from and around the primary conduit outlet 12 and secondary conduit outlets 14A, 14B and extends in a downstream direction to terminate in a beveled surface B. The inner surface of the collar wall has an ellipsoid cross-sectional shape. The middle portion of the inner wall surface extends in a direction parallel to an axis of the primary conduit. Adjacent each secondary conduit outlet 14A, 14B are corresponding inner wall surface end portions 5A, 5B. The end portions 5A, 5B diverge outwardly at an oblique angle to the primary conduit axis. Before the fluidic deviation according to the invention is initiated, a jet gas (which for clarity's sake will be termed the first gas) exits the primary conduit outlet 12 along the axis of the primary conduit. The inner wall surface defines a vectoring space into which the jet can expand. For ease of manufacture, the collar 9 and main body 7 are typically machined separately and are fastened together as described above. However, they may be formed in a single integral piece and later machined to form all of the necessary structures.

In the counterflow embodiment of the lance of FIGS. 2A, 2B, 2C, 3, and 4, a vacuum is supplied to the inlet 3A of one of the secondary conduits. This creates a region of sub atmospheric pressure adjacent a peripheral region of the jet in the vectoring space downstream of outlet 14A. Due to the pressure differential between the region of sub atmospheric pressure and the jet, the jet is deviated at an angle to the axis of the primary conduit towards inner wall surface 5A. Given a sufficient degree of applied vacuum, the jet will "attach" to the inner wall surface 5A to produce a stable deviated jet. At the same time, inlet 3B can be open or closed or a coflow of the second gas can also be supplied through it. Similarly, application of vacuum to inlet 3B of the other of the secondary conduits will deviate the jet towards inner wall surface 5B and attach given a sufficient degree of vacuum. For a given flow rate of the first gas through a given lance, the degree of vacuum may be adjusted in an empirical manner to determine and optimal level.

In the co-flow embodiment of the lance of FIGS. 2A, 2B, 2C, 3, and 4, a flow of gas (which for clarity's sake will be termed the second gas but which may have the same or different composition as the first gas) is allowed through a secondary conduit and exits outlet 14A. The pressures of the sources of first and second gases upstream of the primary and secondary conduits are selected such that the static pressure of the co-flow adjacent the jet is lower than of the jet. This creates a pressure differential between the co-flow and the jet which deviates the jet towards the end portion 5A. Given a sufficiently great pressure differential, the jet "attaches" to the end portion 5A of the inner wall surface to produce a stable deviated jet. Similarly, if the flow of the second gas is instead initiated through the other secondary conduit and exits outlet 14B, the jet is deviated towards the end portion 5B and attach given a sufficiently high pressure differential. One of ordinary skill in the art will recognize that a sufficiently higher velocity of the co-flowing second gas adjacent the jet will create the pressure differential necessary for deviation of the jet. Because the flow rate of the first gas is driven by the requirements of the reaction space and is typically fixed, for a given lance configuration, an operator may adjust the pressure of the second gas upstream of the secondary conduit in an empirical manner in order to achieve a desired velocity for the co-flow and thus a desired pressure differential.

Regardless of whether the lance of FIGS. 2A, 2B, 2C, 3, and 4 is operated according to the counterflow or the co-flow embodiment, alternation of vacuum applied to, or flow of the second gas allowed through, the two secondary conduits will alternatingly deviate the jet back and forth across a generally straight line-shaped target area.

Figure 6:
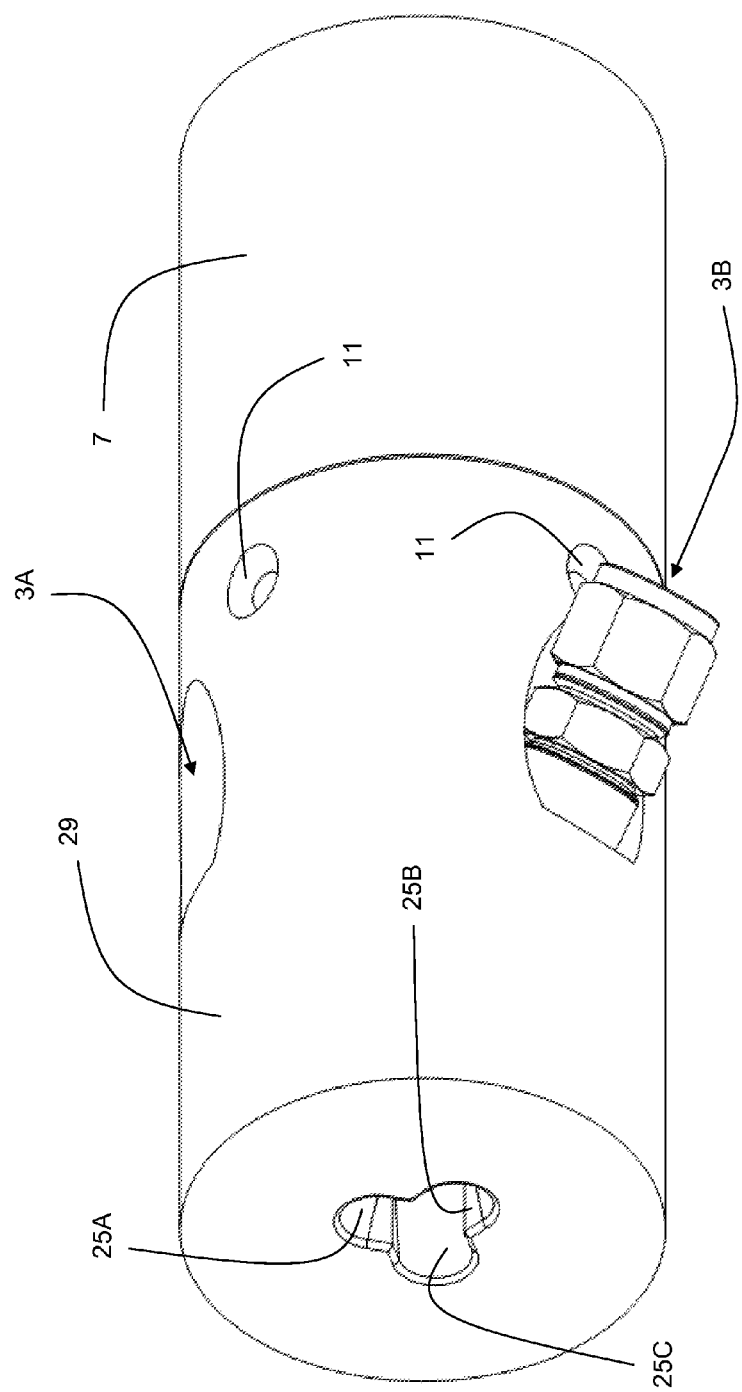
FIG. 6 is a isometric view of the lance of FIG. 5.

As best illustrated in FIGS. 5A, 5B, and 6, another lance embodiment includes a collar 29 secured to a main body 7 with fasteners inserted through bores 11. A converging-diverging primary conduit is formed in the main body 7 and extends along an axis. The primary conduit extends between an inlet and outlet 12. Three secondary conduits are formed in the collar 29. The first secondary conduit extends between an inlet 3A and an outlet 24A, while the second and third secondary conduits correspondingly extend between inlets 3B, 3C and outlets 24B, 24C. The collar 29 includes a wall that circumferentially extends from and around the primary conduit outlet 12 and secondary conduit outlets 24A, 24B, 24C and extends in a downstream direction to terminate in a beveled surface B2. The inner surface of the collar wall has a three-lobed cross-sectional shape. Each of the secondary conduit outlets 24A, 24B, 24C is disposed adjacent to and immediately upstream of a respective collar wall inner surface lobe portion 25A, 25B, 25C. The collar wall inner surface also includes inwardly extending partial dividers 25G, 25E, 25F that separate adjacently disposed lobe portions 25A and 25B, 25B and 25C, and 25C and 25A, respectively. The collar wall inner surface extends in a direction parallel to the axis of the primary conduit at each of the dividers 25G, 25E, 25F but diverges outwardly away from the primary conduit outlet 12 at the lobe portions 25A, 25B, 25C. Before the fluidic deviation according to the invention is initiated, the first gas exits the primary conduit outlet 12 as a jet along the axis of the primary conduit. The inner collar wall surface defines a vectoring space into which the jet can expand. For ease of manufacture, the collar 29 and main body 7 are typically machined separately and are fastened together as described above. However, they may be formed in a single integral piece and later machined to form all of the necessary structures.

In the counterflow embodiment the lance of FIGS. 5A, 5B, and 6, a vacuum is supplied to the inlet 3A of one of the three secondary conduits. This creates a region of sub atmospheric pressure adjacent a peripheral region of the jet in the vectoring space downstream of outlet 24A. Due to the pressure differential between the region of sub atmospheric pressure and the jet, the jet is deviated at an angle to the axis of the primary conduit towards lobe portion 25A. Given a sufficient degree of applied vacuum, the jet will "attach" to the lobe portion 25A to produce a stable deviated jet. Similarly, application of vacuum to an inlet 3B, 3C of one of the other secondary conduits will deviate the jet towards lobe portion 25B, 25C, respectively and attach given a sufficient degree of vacuum. For a given flow rate of the first gas through a given lance, the degree of vacuum may be adjusted in an empirical manner to determine and optimal level.

In the co-flow embodiment the lance of FIGS. 5A, 5B, and 6, a flow of the second gas is allowed through a secondary conduit and exits outlet 24A. The pressures of the sources of first and second gases upstream of the primary and secondary conduits are selected such that the static pressure of the co-flow adjacent the jet is lower than of the jet. This creates a pressure differential between the co-flow and the jet which deviates the jet towards the lobe portion 25A. Given a sufficiently great pressure differential, the jet "attaches" to the lobe portion 25A to produce a stable deviated jet. Similarly, if the flow of the second gas is instead initiated through another of the secondary conduit and exits outlet 24B or 24C, the jet is deviated towards a respective lobe portion 25B, 25C and attaches given a sufficiently high pressure differential. One of ordinary skill in the art will recognize that a sufficiently higher velocity of the co-flowing second gas adjacent the jet will create the pressure differential necessary for deviation of the jet. Because the flow rate of the first gas is driven by the requirements of the reaction space and is typically fixed, for a given lance configuration, an operator may adjust the pressure of the second gas upstream of the secondary conduit in an empirical manner in order to achieve a desired velocity for the co-flow and thus a desired pressure differential.

Regardless of whether the lance of FIGS. 5A, 5B, and 6 is operated according to the counterflow or the co-flow embodiment, alternation of vacuum applied to, or flow of the second gas allowed through, the three secondary conduits will alternatingly deviate the jet back and forth across a generally triangular target area.

Figure 7:
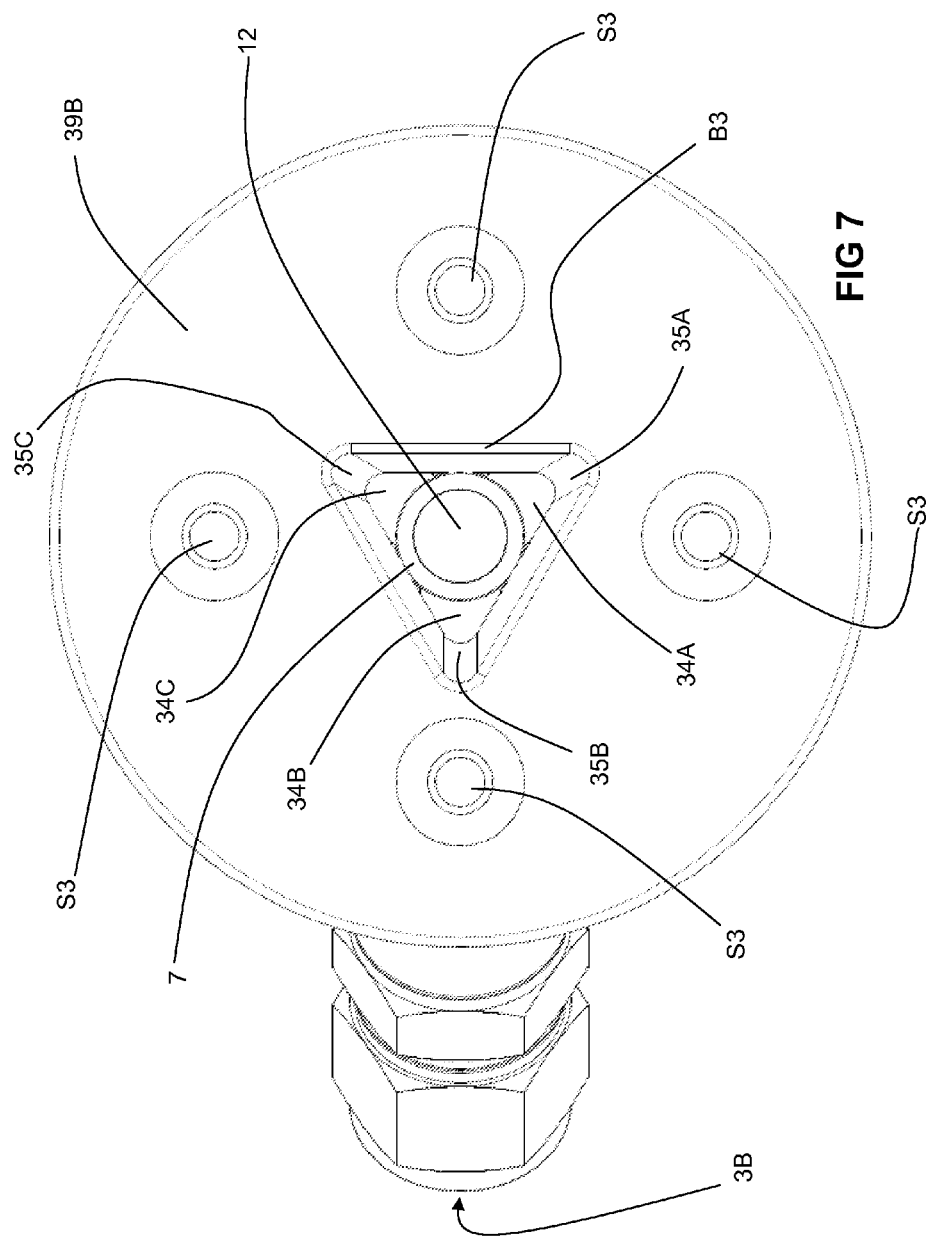
FIG. 7 is a top view of a lance whose jet may be deviated between different corners of a triangular collar wall.
Figure 8:
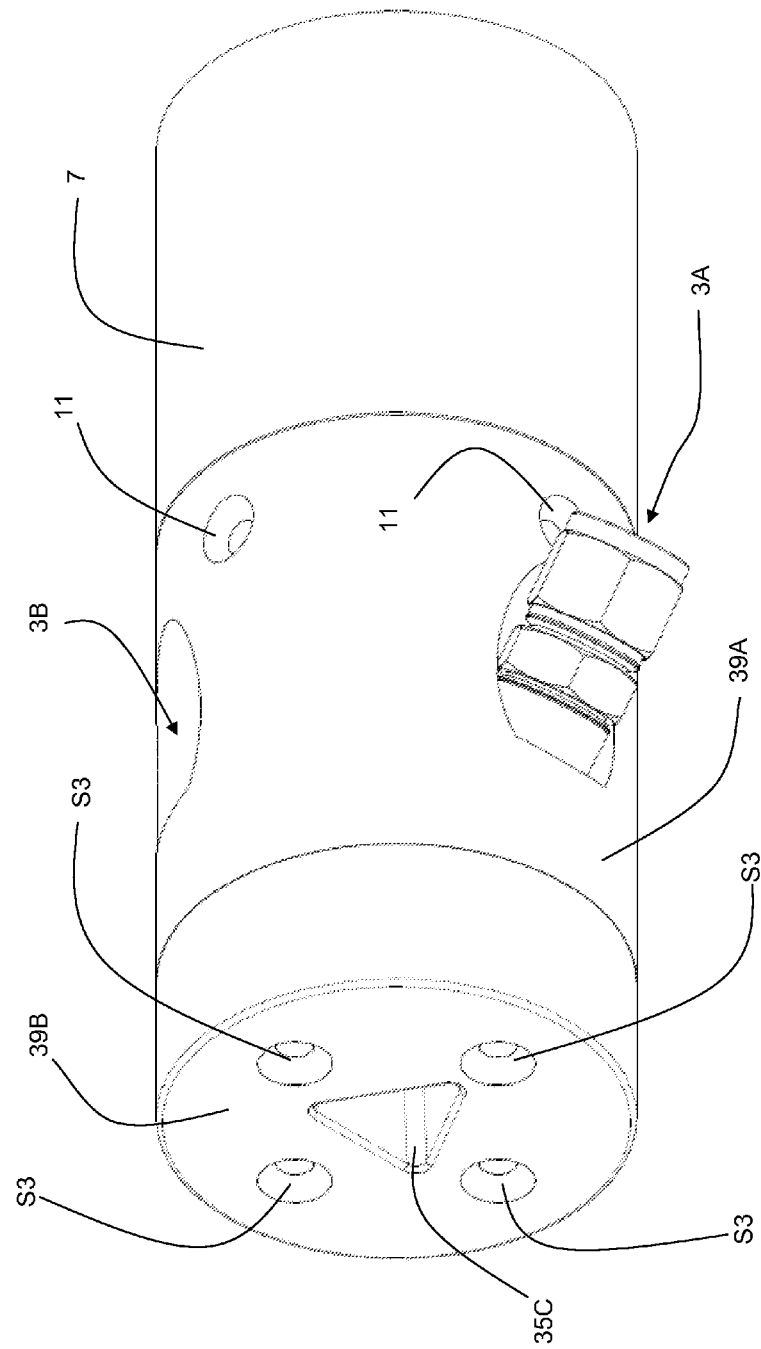
FIG. 8 is a isometric view of the lance of FIG. 7.
Figure 9:
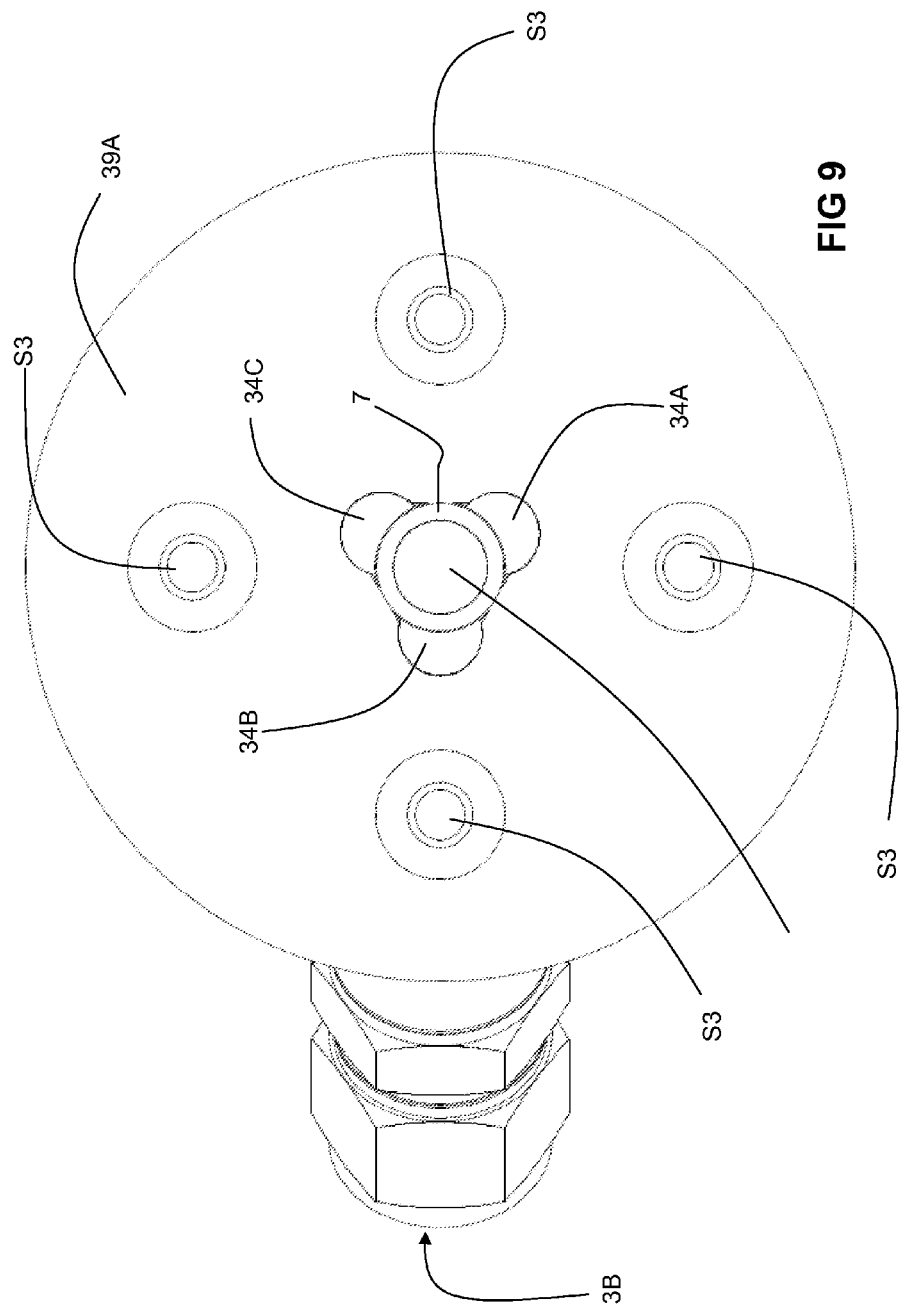
FIG. 9 is a top view of the lance of FIG. 7 with the top collar 39B removed.
Figure 10:
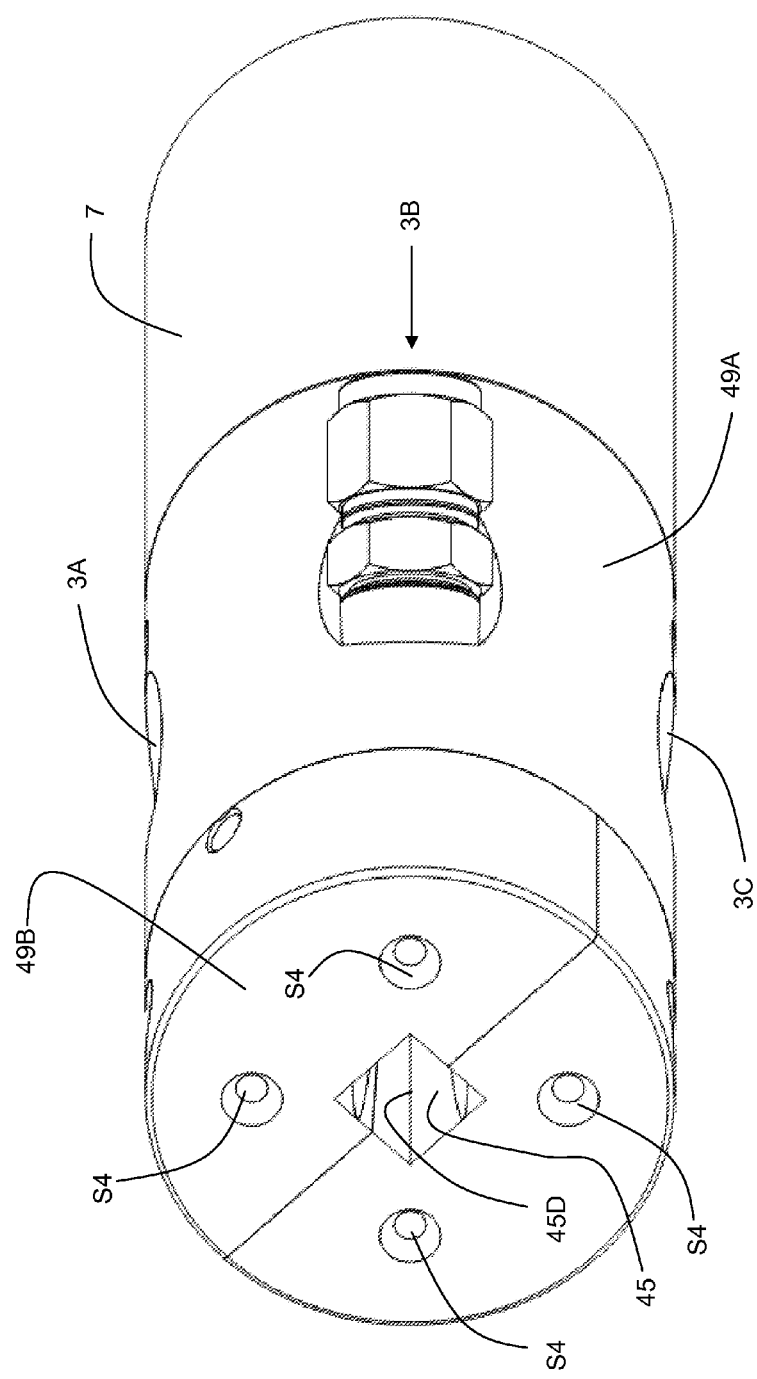
FIG. 10 is a isometric view of a lance whose jet may be deviated between different corners of a square collar wherein each of one pair of opposed corners is associated with a collar wall groove.
Figure 11:
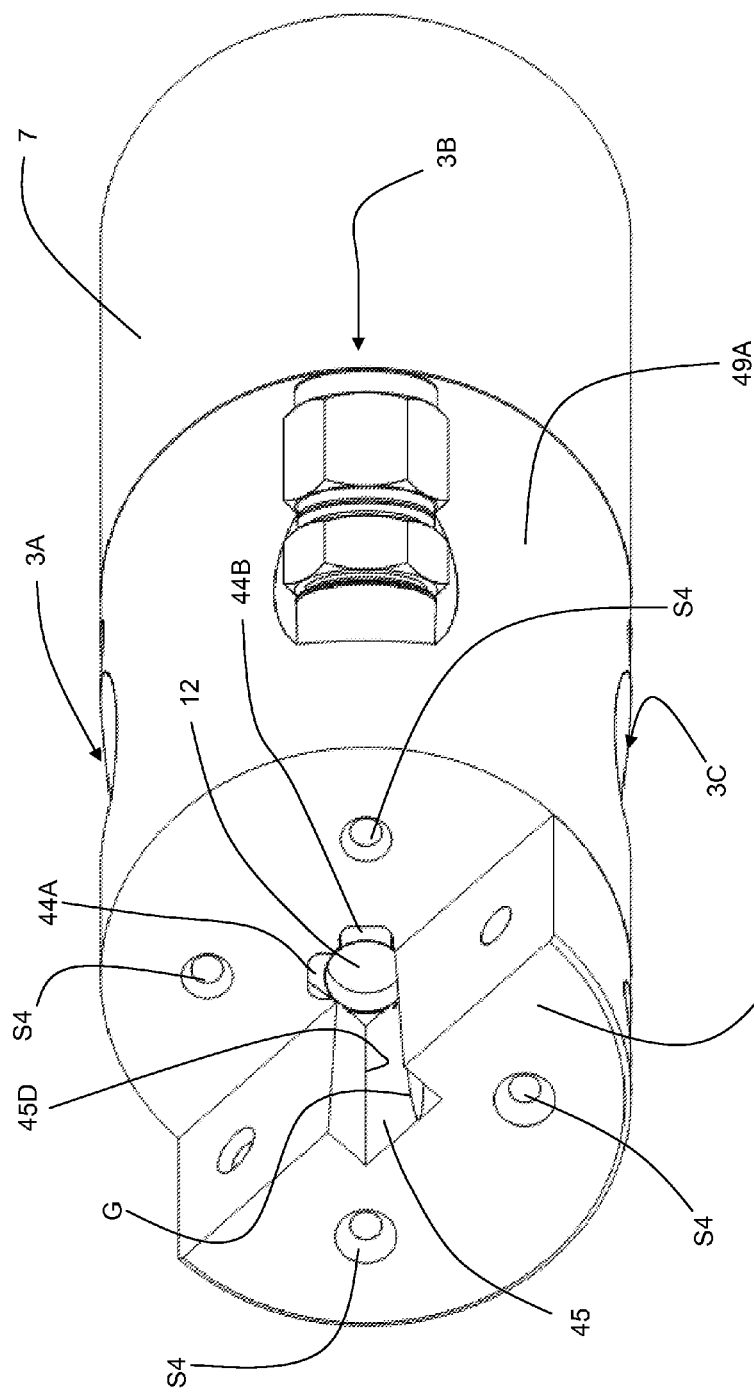
FIG. 11 is the isometric view of FIG. 10 with portions broken away.
Figure 12A:
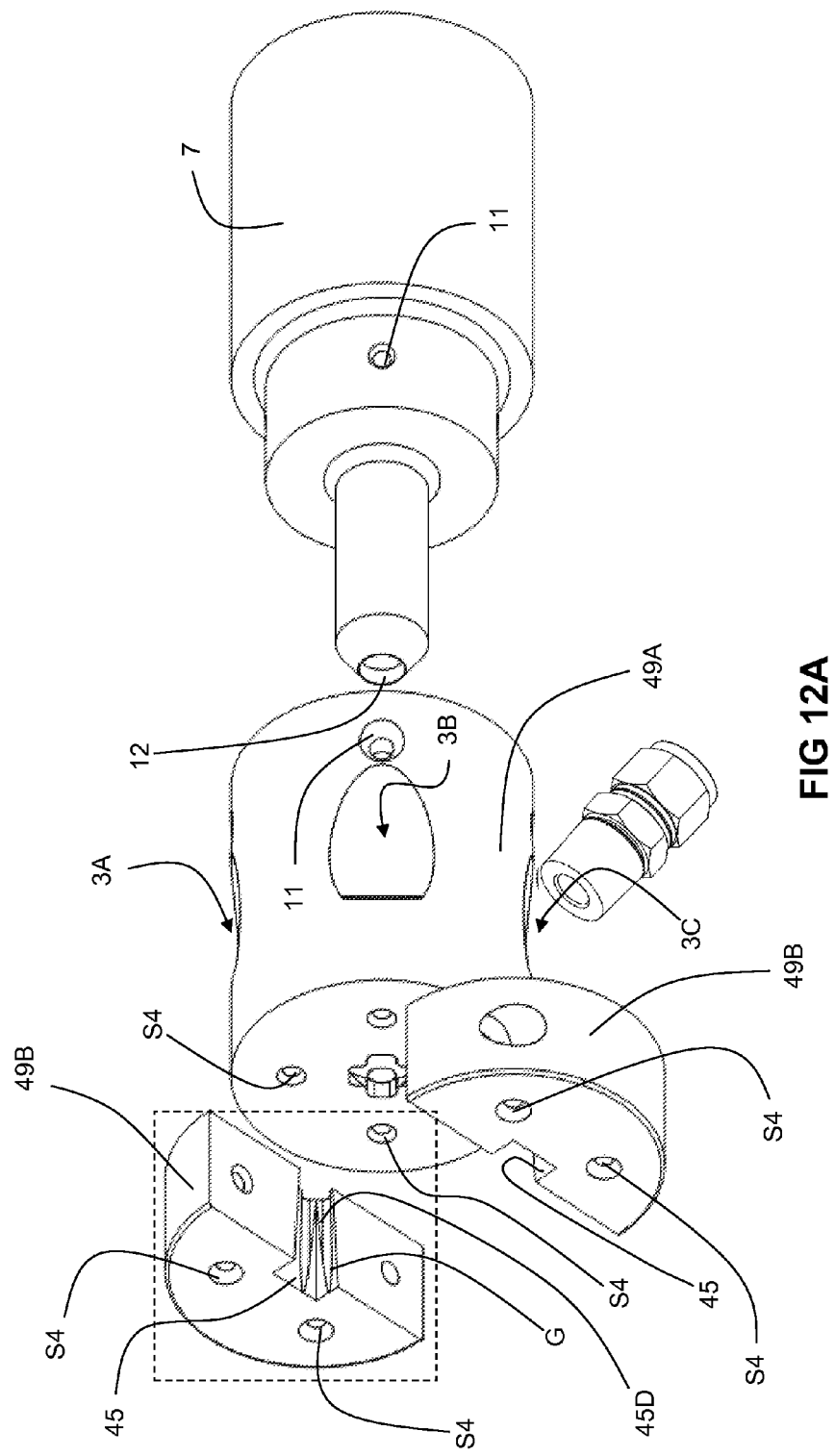
FIG. 12A is an exploded, isometric view of the lance of FIGS. 10 and 11 wherein all corners are associated with collar wall grooves.
Figure 13A:
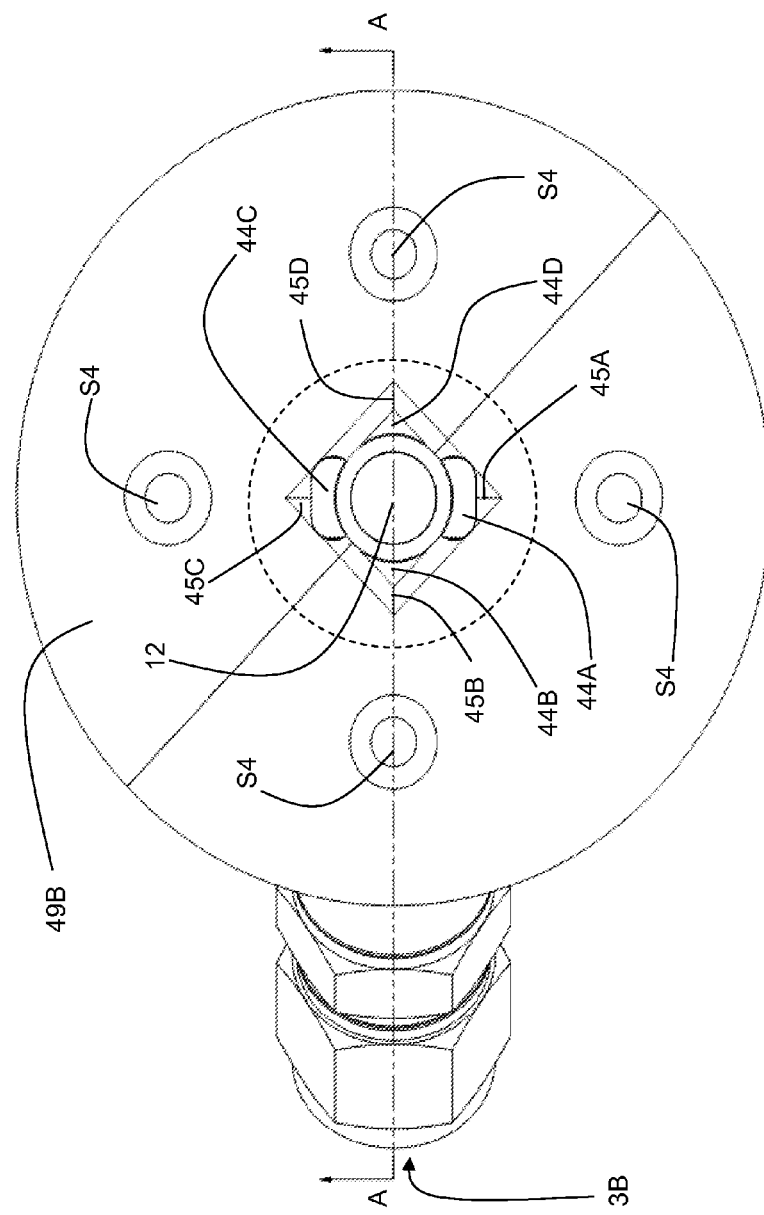
FIG. 13A is a top view of the lance of FIGS. 10, 11, 12A, and 12B.

As best illustrated in FIGS. 7, 8, and 9, another lance embodiment includes an intermediate collar 39A secured to a main body 7 with fasteners inserted through bores 11 and a top collar 39B secured to the intermediate collar 39A with fasteners inserted through bores S3. A converging-diverging primary conduit is formed in the main body 7 and extends along an axis. The primary conduit extends between an inlet and outlet 12. Three secondary conduits are formed in the intermediate collar 39A. The first secondary conduit extends between an inlet 3A and an outlet 34A, while the second and third secondary conduits correspondingly extend between inlets 3B, 3C and outlets 34B, 34C. The top collar 39A includes a wall that circumferentially extends from and around the primary conduit outlet 12 and secondary conduit outlets 34A, 34B, 34C and extends in a downstream direction to terminate in a beveled surface B3. The inner surface of the top collar wall has a triangular cross-sectional shape with rounded corners. Each of the secondary conduit outlets 34A, 34B, 34C is disposed adjacent to and immediately upstream of a respective corner 35A, 35B, 35C of the inner wall surface of the top collar 39B. Except for the corners 35A, 35B, 35C, the inner wall surface of the top collar 39B extends in a direction parallel to the axis of the primary conduit. At the corners 35A, 35B, 35C, the inner wall surface of the top collar 39B diverges outwardly away from the primary conduit outlet 12. Before the fluidic deviation according to the invention is initiated, the first gas exits the primary conduit outlet 12 as a jet along the axis of the primary conduit. The inner wall surface of the top collar 39B defines a vectoring space into which the jet can expand. For ease of manufacture, the intermediate collar 39A, top collar 39B, and main body 7 are typically machined separately and are fastened together as described above. However, they may be formed in a single integral piece and later machined to form all of the necessary structures.

In the counterflow embodiment for the lance of FIGS. 7, 8, and 9, a vacuum is supplied to the inlet 3A of one of the three secondary conduits. This creates a region of sub atmospheric pressure adjacent a peripheral region of the jet in the vectoring space downstream of outlet 34A. Due to the pressure differential between the region of sub atmospheric pressure and the jet, the jet is deviated at an angle to the axis of the primary conduit towards corner 35A. Given a sufficient degree of applied vacuum, the jet will "attach" to the corner 35A to produce a stable deviated jet. Similarly, application of vacuum to an inlet 3B, 3C of one of the other secondary conduits will deviate the jet towards corner 35B, 35C, respectively and attach given a sufficient degree of vacuum. For a given flow rate of the first gas through a given lance, the degree of vacuum may be adjusted in an empirical manner to determine and optimal level.

In the co-flow embodiment for the lance of FIGS. 7, 8, and 9, a flow of the second gas is allowed through a secondary conduit and exits outlet 34A. The pressures of the sources of first and second gases upstream of the primary and secondary conduits are selected such that the static pressure of the co-flow adjacent the jet is lower than of the jet. This creates a pressure differential between the co-flow and the jet which deviates the jet towards the lobe portion 35A. Given a sufficiently great pressure differential, the jet "attaches" to corner 35A to produce a stable deviated jet. Similarly, if the flow of the second gas is instead initiated through another of the secondary conduit and exits outlet 34B or 34C, the jet is deviated towards a respective corner 35B, 35C and attaches given a sufficiently high pressure differential. One of ordinary skill in the art will recognize that a sufficiently higher velocity of the co-flowing second gas adjacent the jet will create the pressure differential necessary for deviation of the jet. Because the flow rate of the first gas is driven by the requirements of the reaction space and is typically fixed, for a given lance configuration, an operator may adjust the pressure of the second gas upstream of the secondary conduit in an empirical manner in order to achieve a desired velocity for the co-flow and thus a desired pressure differential.

Regardless of whether the lance of FIGS. 7, 8, and 9 is operated according to the counterflow or the co-flow embodiment, alternation of vacuum applied to, or flow of the second gas allowed through, the three secondary conduits will alternatingly deviate the jet back and forth across a generally triangular target area.

As best illustrated in FIGS. 10, 11, 12A-12B, 13A-13B, 14A-14D, and 15, another lance embodiment includes an intermediate collar 49A secured to a main body 7 with fasteners inserted through bores 11 and a top collar 49B secured to the intermediate collar 49A with fasteners inserted through bores S4. A converging-diverging primary conduit is formed in the main body 7 and extends along an axis between an inlet and outlet 12. It includes a straight section 2, a converging section which narrows to a neck 6 and a diverging section. Four secondary conduits are formed in the intermediate collar 49A. The first secondary conduit extends between an inlet 3A and an outlet 44A, while the second, third, and fourth secondary conduits correspondingly extend between inlets 3B, 3C, 3D and outlets 44B, 44C, 44D, respectively. The top collar 49A includes a wall that circumferentially extends from and around the primary conduit outlet 12 and secondary conduit outlets 44A, 44B, 44C, 44D. Each of the secondary conduit outlets 44A, 44B, 44C, 44D is disposed adjacent to and upstream of a respective corner 45A, 45B, 45C, 45D of the inner wall surface of the top collar 39B.

The inner surface of the top collar wall has a generally frustopyramidal (frustum of a pyramid) shape with four corners 45A, 45B, 45C, 45D and grooves G formed in two corners 45A, 45C. Before the fluidic deviation according to the invention is initiated, the first gas exits the primary conduit outlet 12 as a jet along the axis of the primary conduit and the grooved, frustopyramidal top collar inner wall surface defines a vectoring space into which the jet can expand. Each groove G represents the portion of the associated corner 45A, 45C that is machined away in order to project the cross-sectional shape of the secondary conduit outlets 44A, 44C in the downstream direction parallel to the primary conduit axis. The frustopyramidal aspect of the top collar inner wall surface includes a small base adjacent the primary and secondary conduit outlets 12, 44A, 44B, 44C, 44D and a large base at the downstream extremity of top collar 49B.

Figure 14C:
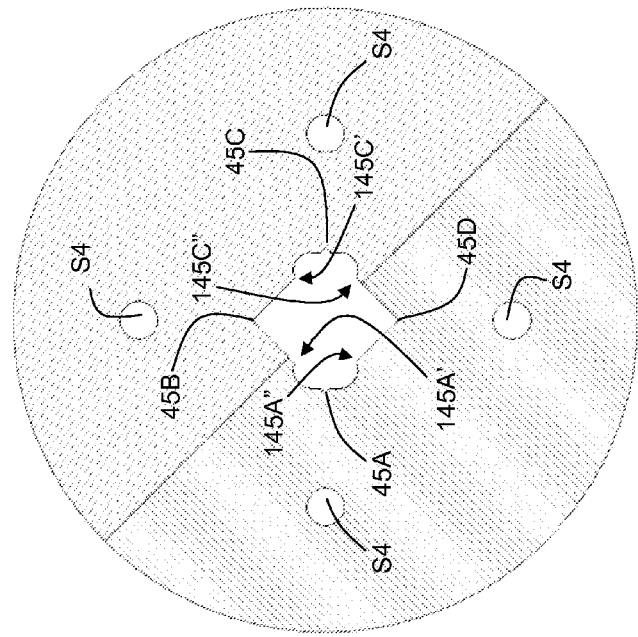
FIG. 14C is a cross-sectional view of the lance of FIG. 14A taken along line C-C.
Figure 14B:
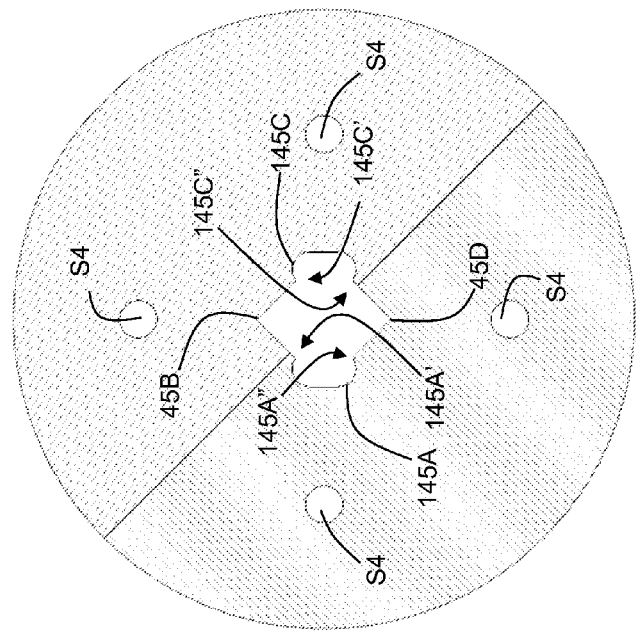
FIG. 14B is a cross-sectional view of the lance of FIG. 14A taken along line B-B.
Figure 15:
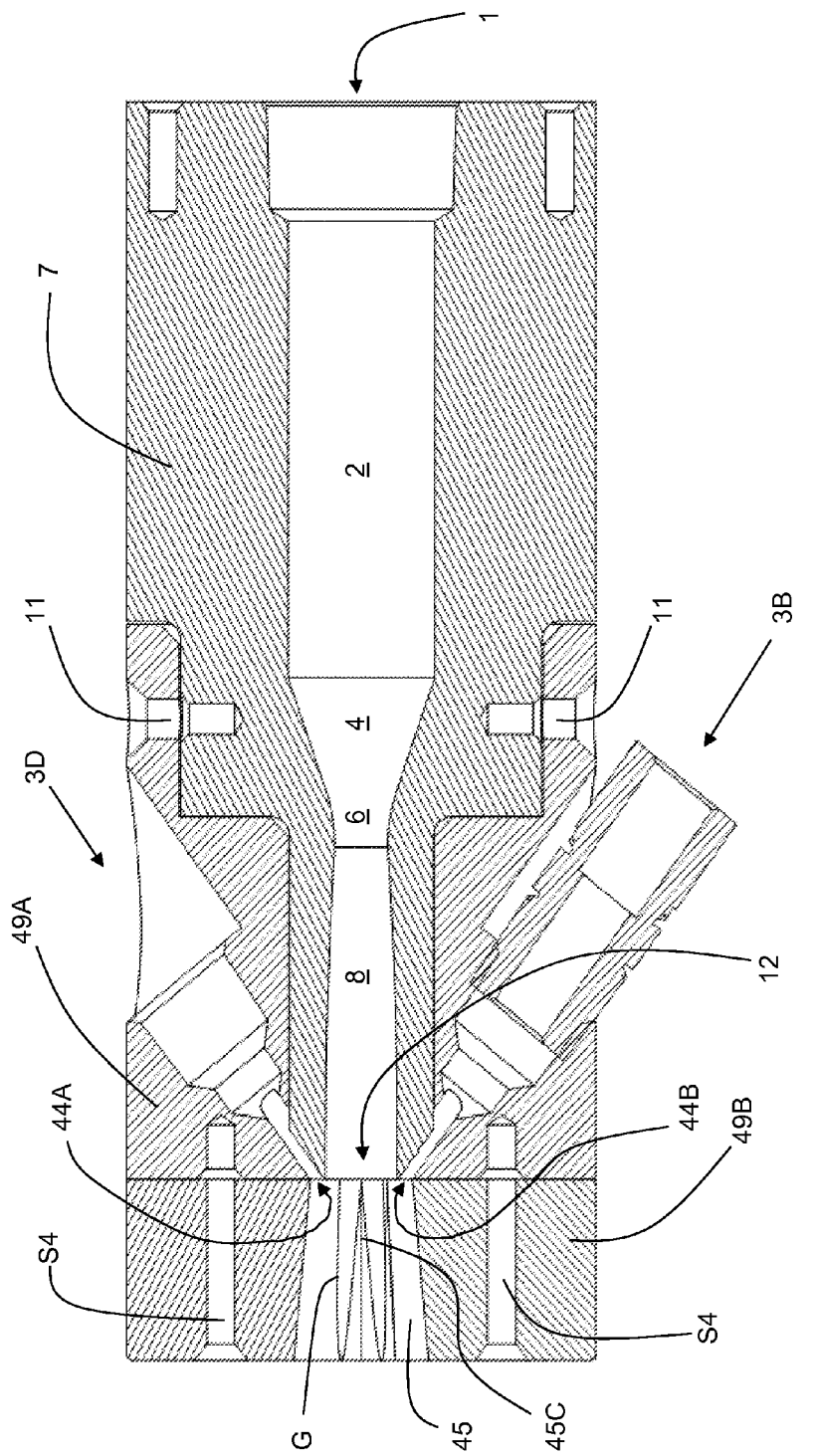
FIG. 15 is a cross-sectional view of the lance of FIGS. 10, 11, 12A-12B, 13A-13B, and 14A-14E taken along line A-A.

As best illustrated in FIG. 14B, the narrow base has a pair of opposite corners 45B, 45D. At the other opposite portions of the narrow base are curved surfaces 145A, 145C. In between curved surface 145A and corner 45B is a jutting portion 145A' while jutting portion 145A" is in between curved surface 145A and corner 45D. Jutting portions 145C', 145C" are in between curved surface 145C & corner 45B and curved surface 145C and corner 45D, respectively. As best shown in FIGS. 14C-14E, the cross-section of the frustopyramidal aspect of the inner surface of the top collar wall increases in the downstream direction. Thus, corners 45C, 45A emerge in cross-sectional view in FIG. 14C and become even more prominent in FIGS. 14D, 14E. On the other hand, because the grooves G extend from secondary conduit outlets 44A, 44C in a direction parallel to the axis of the primary conduit, the curved surfaces 145A, 145C remain static relative to the axis of the primary conduit and are eventually swallowed up by corners 45A, 45C.

For ease of manufacture, the intermediate collar 39A, top collar 39B, and main body 7 are typically machined separately and are fastened together as described above. However, they may be formed in a single integral piece and later machined to form all of the necessary structures.

In the counterflow embodiment for the lance of FIGS. 10, 11, 12A-12B, 13A-13B, 14A-14D, and 15, a vacuum is supplied to the inlet 3A of one of the four secondary conduits. This creates a region of sub atmospheric pressure (crescent-shaped in cross-section) bounded by curved surface 145A, jutting portions 145A', 145A", and a peripheral region of the jet in the vectoring space downstream of outlet 44A. Due to the pressure differential between this region of sub atmospheric pressure and the jet, the jet is deviated at an angle to the axis of the primary conduit towards curved surface 145A and corner 45A. Given a sufficient degree of applied vacuum, the jet will "attach" to the curved surface 145A and corner 45A to produce a stable deviated jet. Similarly, application of vacuum to an inlet 3C of another of the other secondary conduits will deviate the jet towards curved surface 145C and corner 45C and attach given a sufficient degree of vacuum. When the vacuum is supplied to the inlet 3B of one of the two remaining secondary conduits, a region of sub atmospheric pressure is created that is bounded by the frustopyramidal inner surface of the top collar wall at corner 45B, jutting portions 145A', 145C', and a peripheral region of the jet. Similarly, application of vacuum to the inlet 3D of another one of the two remaining secondary conduits will create a region of sub atmospheric pressure that is bounded by the frustopyramidal top collar wall inner surface at corner 45D, jutting portions 145A", 145C", and a peripheral region of the jet. For a given flow rate of the first gas through a given lance, the degree of vacuum may be adjusted in an empirical manner to determine and optimal level.

In the counterflow embodiment of the lance of FIGS. 10, 11, 12A-12B, 13A-13B, 14A-14D, and 15, it is believed that a peripheral portion of the jet intersects the jutting portions 145A', 145A", 145C', 145C" at tangent points to prevent "cross-talk" of gas flows between various secondary conduit outlets 44A, 44B, 44C, 44D. By preventing cross-talk, a relatively lower degree of vacuum is needed to attain a desired pressure differential between the jet and the region of sub atmospheric pressure at hand. The curved surfaces 145A, 145C are also believed to more easily create the regions of sub atmospheric pressure adjacent the peripheral region of the jet in comparison to the top collar wall inner surface adjacent corners 45B, 45D. While the lance of FIGS. 10, 11, 12A-12B, 13A-13B, 14A-14D, and 15 illustrates grooves G formed only in corners 45A, 45C, it is understood that similar grooves may be formed in the top collar inner wall surface in corners 45B, 45D. Conversely, each of the corners 45A, 45B, 45C, 45D may be grooveless.

In the co-flow embodiment for the lance of FIGS. 10, 11, 12A-12B, 13A-13B, 14A-14D, and 15, a flow of the second gas is allowed through a secondary conduit and exits outlet 44A in between curved surface 145A and corner 45A, jutting portions 145A', 145A" and a peripheral region of the jet. The pressures of the sources of first and second gases upstream of the primary and secondary conduits are selected such that the static pressure of the co-flow adjacent the jet is lower than of the jet. This creates a pressure differential between the co-flow and the jet which deviates the jet towards the curved surface 145A and corner 45A. Given a sufficiently great pressure differential, the jet "attaches" to the curved surface 145A and corner 45A to produce a stable deviated jet. Similarly, if the flow of the second gas is instead initiated through another of the secondary conduit and exits outlet 44C, the jet is deviated towards a respective curved surface 145C and corner 45C and attaches given a sufficiently high pressure differential. When the flow of the second gas is instead initiated through the appropriate one of the two remaining secondary conduits, it may exit outlet 44B in between corner 45B, jutting portions 145A', 145C' and a peripheral region of the jet and be deviated towards corner 45B and attach given a sufficiently great enough pressure differential. Similarly, a flow of the second gas which is instead initiated through the opposite of the two remaining secondary conduits and exits outlet 44D between corner 45D, jutting portions 145A", 145C" and a peripheral region of the jet will cause the jet to be deviated towards corner 45D and attach given a sufficiently great enough pressure differential. One of ordinary skill in the art will recognize that a sufficiently higher velocity of the co-flowing second gas adjacent the jet will create the pressure differential necessary for deviation of the jet. Because the flow rate of the first gas is driven by the requirements of the reaction space and is typically fixed, for a given lance configuration, an operator may adjust the pressure of the second gas upstream of the secondary conduit in an empirical manner in order to achieve a desired velocity for the co-flow and thus a desired pressure differential.

Regardless of whether the lance of FIGS. 10, 11, 12A-12B, 13A-13B, 14A-14D, and 15 is operated according to the counterflow or the co-flow embodiment, alternation of vacuum applied to, or flow of the second gas allowed through, the three secondary conduits will alternatingly deviate the jet back and forth across a generally quadrilateral target area.

Figure 16:
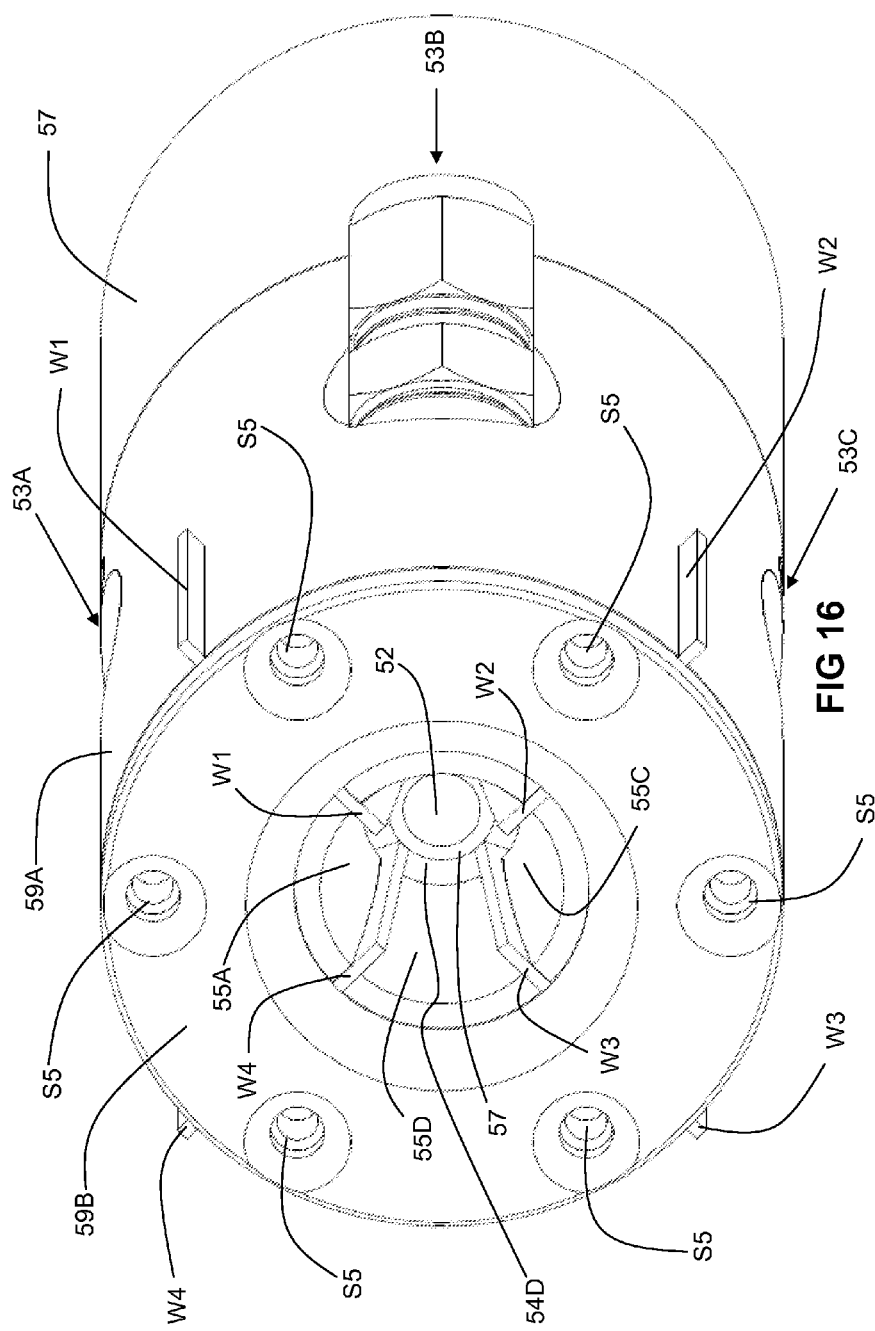
FIG. 16 is a isometric view of a lance whose jet may be deviated between different quarters of a circular collar wall that are separated by dividers.
Figure 17:
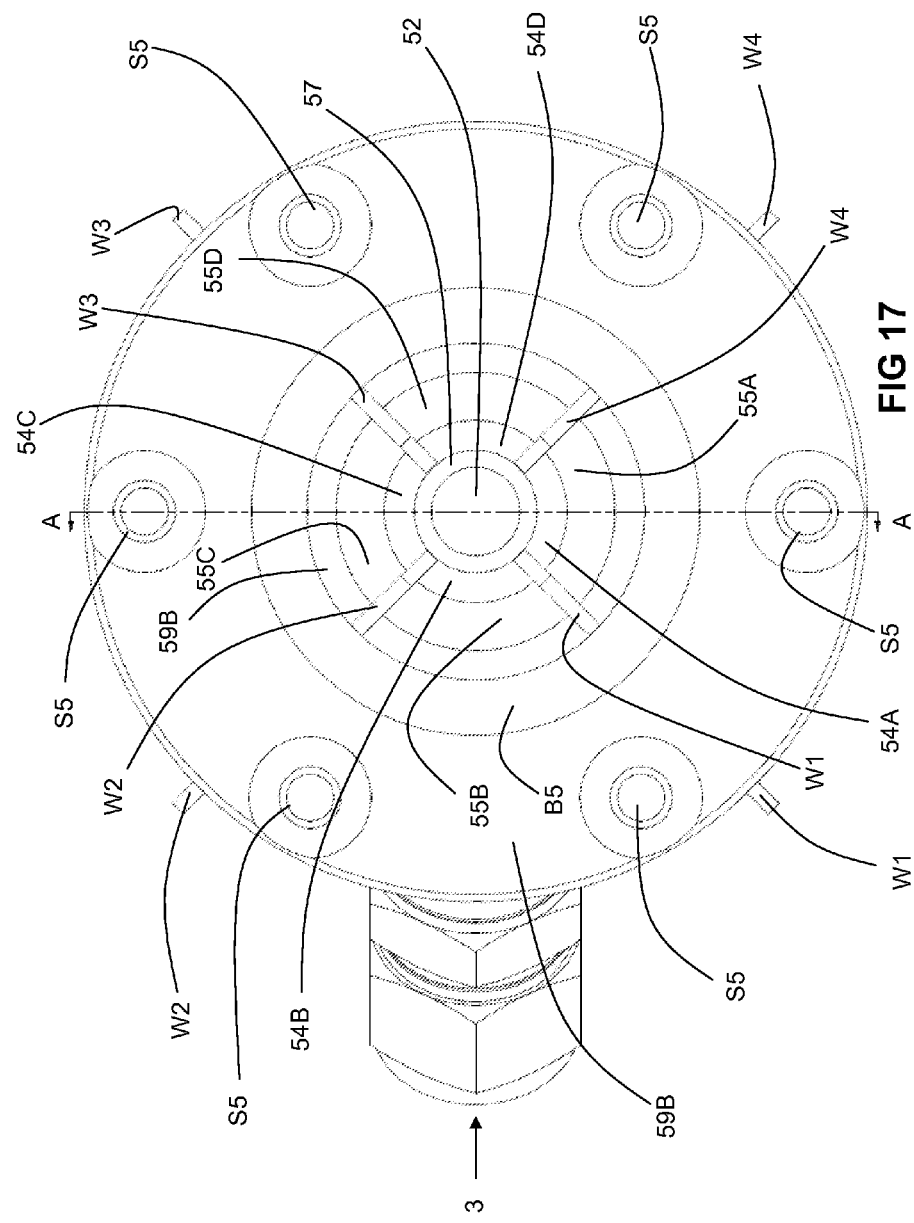
FIG. 17 is a top view of the lance of FIG. 15.
Figure 18:
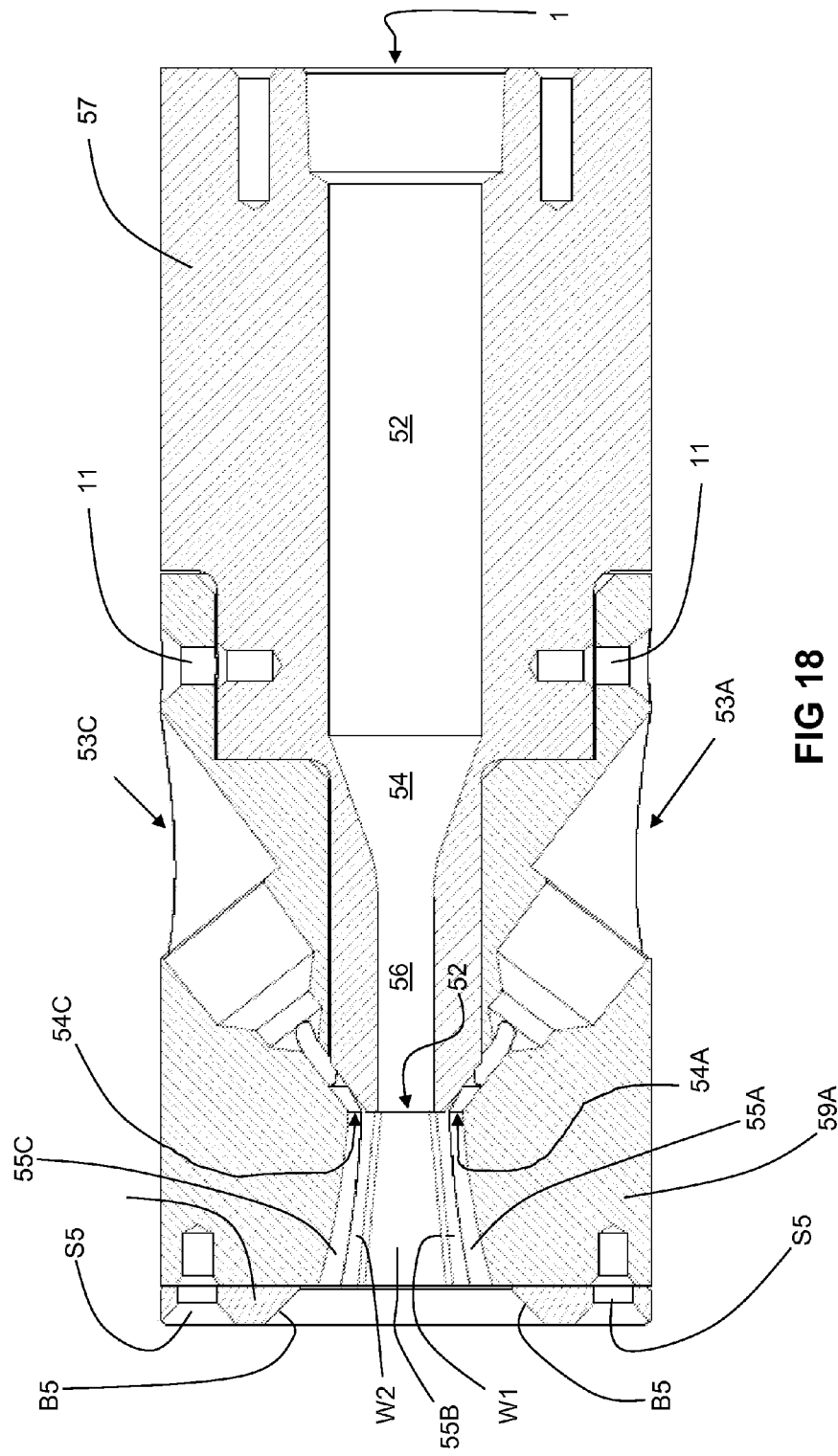
FIG. 18 is a cross-sectional view of the lance of FIGS. 15 and 16 taken along line A-A.

As best illustrated in FIGS. 16-18, another lance embodiment includes an intermediate collar 59A secured to a main body 57 with fasteners inserted through bores 11 and a top collar 59B secured to the intermediate collar 59A with fasteners inserted through bores S5. A primary conduit is formed in the main body 7 and extends along an axis. The primary conduit extends between an inlet 1 and outlet 52 includes an upstream straight section 52, a diverging section 54, and a downstream straight section 56. Four secondary conduits are formed in the intermediate collar 59A. The first secondary conduit extends between an inlet 53A and an outlet 54A, while the second, third, and fourth secondary conduits correspondingly extend between inlets 53B, 53C, 53D and outlets 54B, 54C, 54D. The top collar 59A includes a wall that circumferentially extends from and around the primary conduit outlet 12 and secondary conduit outlets 54A, 54B, 54C, 54D and extends in a downstream direction to terminate in a beveled surface B5. The inner surface of the top collar wall is a frustoconical surface (surface of a frustum of a cone) and includes four sections 55A, 55B, 55C, 55D. The inner surface of the top collar wall diverges in the direction of the jet along the axis of the primary conduit.

The top collar includes four axially distributed slots each one of which extends through the side wall of the top collar and the top collar inner wall surface. The slots are sized to accommodate four dividers W1, W2, W3, and W4 which partially extend out of the slots at the side wall of the top collar and partially extend inwards from the top collar inner wall surface. The dividers W1, W2, W3, W4 also extend in a direction parallel to the divergence of the collar wall inner surface from immediately downstream of the primary and secondary conduit outlets 52, 54A, 54B, 54C, 54D and up to the beveled surface B5.

Before the fluidic deviation according to the invention is initiated, the first gas exits the primary conduit outlet 12 as a jet along the axis of the primary conduit. The inner wall surface of the top collar 59B defines a vectoring space into which the jet can expand. Each of the secondary conduits 54A, 54B, 54C, 54D is disposed adjacent to and immediately upstream of a respective quarter portion 55A, 55B, 55C, 55D of the inner wall surface of the top collar 39B. Each combination of two of the four dividers W1, W2, W3, W4 and the quarter portion 55A, 55B, 55C, 55D that they bound defines a vectoring sub-space into which the jet may be deviated according to the mechanism of the invention. Thus, one of the four vectoring sub-spaces is defined by the combination of divider W1, quarter portion 55B, and divider W2. For ease of manufacture, the intermediate collar 59A, top collar 59B, main body 7, and dividers W1, W2, W3, W4 are typically machined separately and are fastened together as described above. However, they may be formed in a single integral piece and later machined to form all of the necessary structures. Additionally, the dividers W1, W2, W3, W4 need not project outwardly from a side of the top collar 59B.

In the counterflow embodiment for the lance of 16-18, a vacuum is supplied to the inlet 53A of one of the four secondary conduits. This creates a region of sub atmospheric pressure adjacent a peripheral region of the jet in the vectoring space downstream of outlet 54A. Due to the pressure differential between the region of sub atmospheric pressure and the jet, the jet is deviated at an angle to the axis of the primary conduit and into the vectoring sub-space defined by divider W4, quarter portion 55A, and divider W1. Given a sufficient degree of applied vacuum, the jet will "attach" to the quarter portion 55A to produce a stable deviated jet. Similarly, application of vacuum to an inlet 53B of one of the other secondary conduits will deviate the jet into the vectoring sub-space defined by divider W1, quarter portion 55B, and divider W2. The jet may be deviated into either of the other vectoring sub-spaces in a similar manner. The jet will also attach to the respective quarter portion 55A, 55B, 55C, 55D given a sufficient degree of vacuum. For a given flow rate of the first gas through a given lance, the degree of vacuum may be adjusted in an empirical manner to determine and optimal level.

In the co-flow embodiment for the lance of FIGS. 16-18, a flow of the second gas is allowed through a secondary conduit and exits outlet 54A. The pressures of the sources of first and second gases upstream of the primary and secondary conduits are selected such that the static pressure of the co-flow adjacent the jet is lower than that of the jet. This creates a pressure differential between the co-flow and the jet which deviates the jet into the vectoring sub-space defined by divider W4, quarter portion 55A, and divider W1. Given a sufficiently great pressure differential, the jet will attach to quarter portion 55A to produce a stable deviated jet. Similarly, if the flow of the second gas is instead initiated through another of the secondary conduits and exits outlet 54B, 54C, or 54D, the jet is deviated into a respective vectoring sub-spaces defined by the various combinations of dividers W1, W2, W3, W4 and quarter portions 55B, 55C, 55D. One of ordinary skill in the art will recognize that a sufficiently higher velocity of the co-flowing second gas adjacent the jet will create the pressure differential necessary for deviation of the jet. Because the flow rate of the first gas is driven by the requirements of the reaction space and is typically fixed, for a given lance configuration, an operator may adjust the pressure of the second gas upstream of the secondary conduit in an empirical manner in order to achieve a desired velocity for the co-flow and thus a desired pressure differential.

Regardless of whether the lance of FIGS. 16-18 is operated according to the counterflow or the co-flow embodiment, alternation of vacuum applied to, or flow of the second gas allowed through, the four secondary conduits will alternatingly deviate the jet back and forth across a generally quadrilateral target area.

While FIGS. 2A-18 illustrate that the inlet of the secondary conduit is positioned on a side of the collar, it can be positioned anywhere on the collar including a position near the inlet of the primary conduit on or adjacent the main body.

Application to Metallurgical Furnaces

When the lance is utilized with a reaction space comprising an EAF, 1-10 lances according to the invention can be used in order to increase foamy slag generation. The invention may be applied to metallurgical vessels other than EAFs in which case it may be used to inject inert gases, in particular, Argon or Nitrogen. Many of such vessels exhibit poor mixing behavior that may be alleviated with supersonic injection of an inert gas jet via the invention for the purpose of stirring a relatively large area of the bath contained therein.

When the lance is used to inject oxygen into an EAF, it may serve several different functions depending upon which stage the metallurgical process is in: 1) melting, 2) beginning of the refining, 3) first half of refining, and 4) last half of refining. During the melting phase, the dynamic lance is used as a classical supersonic lance without deviation of the jet. The oxygen flowing in the lance is used as complementary oxygen for combustion or for post-combustion. During the beginning of the refining, the lance is used in supersonic mode for scrap cutting and for initiating the refining. The lance may be swept in a pattern at a relatively low frequency (typically one degree per second) in order to get an efficient cut of the scrap. It may be desirable to avoid a frequency that is too slow such that the cavity opened up by the lance at one location on the surface of the bath is allowed to completely close over before the jet is swept back to that location. It is during the beginning of the refining, that vertical deviation of the lance be accomplished in order to achieve a more optimal angle of attack (i.e., a more vertical angle). The lance could also be used as a classical lance as well. During the first half of refining, the lance could be horizontally and/or vertically swept in a regular pattern for increasing bath area coverage for greater refining efficiency. During the last half of refining, the jet could be horizontally and/or vertically swept at a relatively higher frequency in order to promote better stirring and increase the foamy slag quality.

Figure 19:
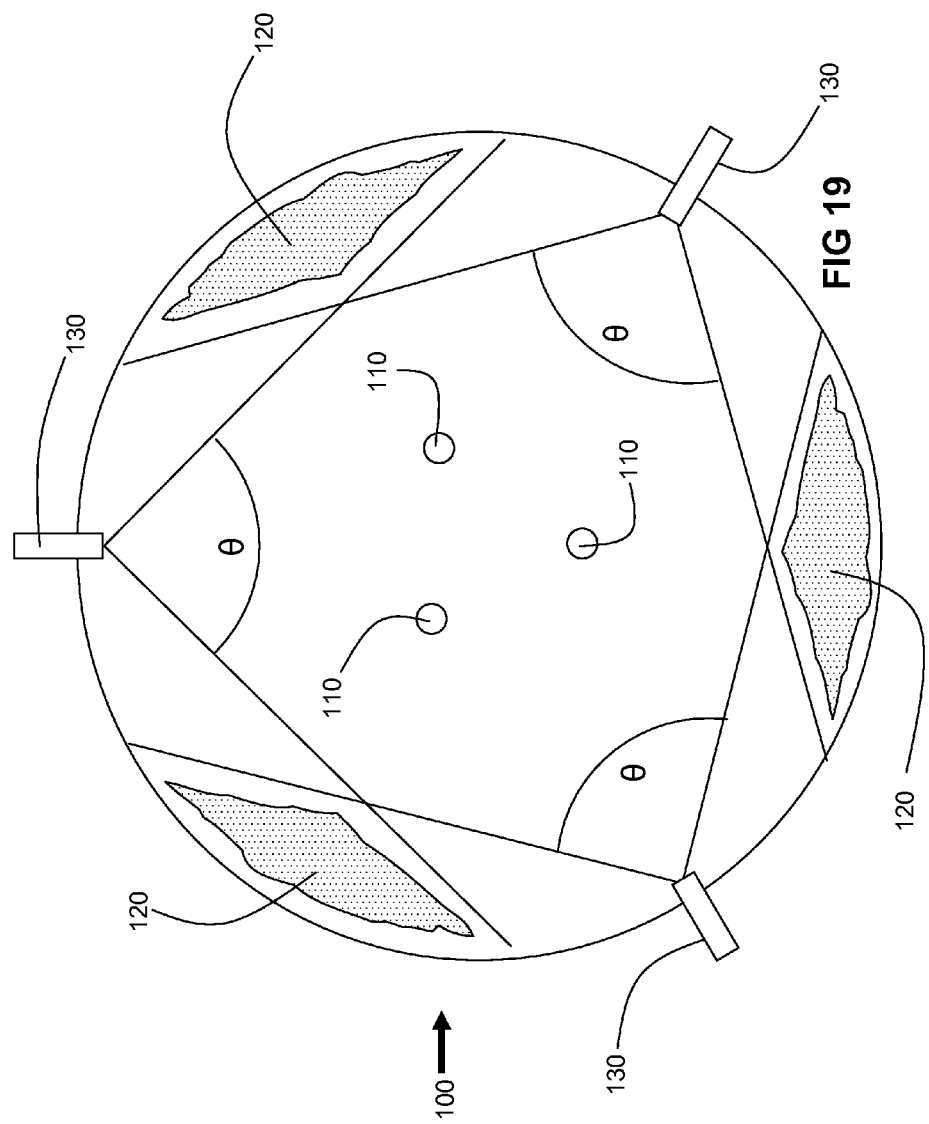
FIG. 19 is a schematic top view of an application of the lance in which the jet is horizontally swept.
Figure 20:
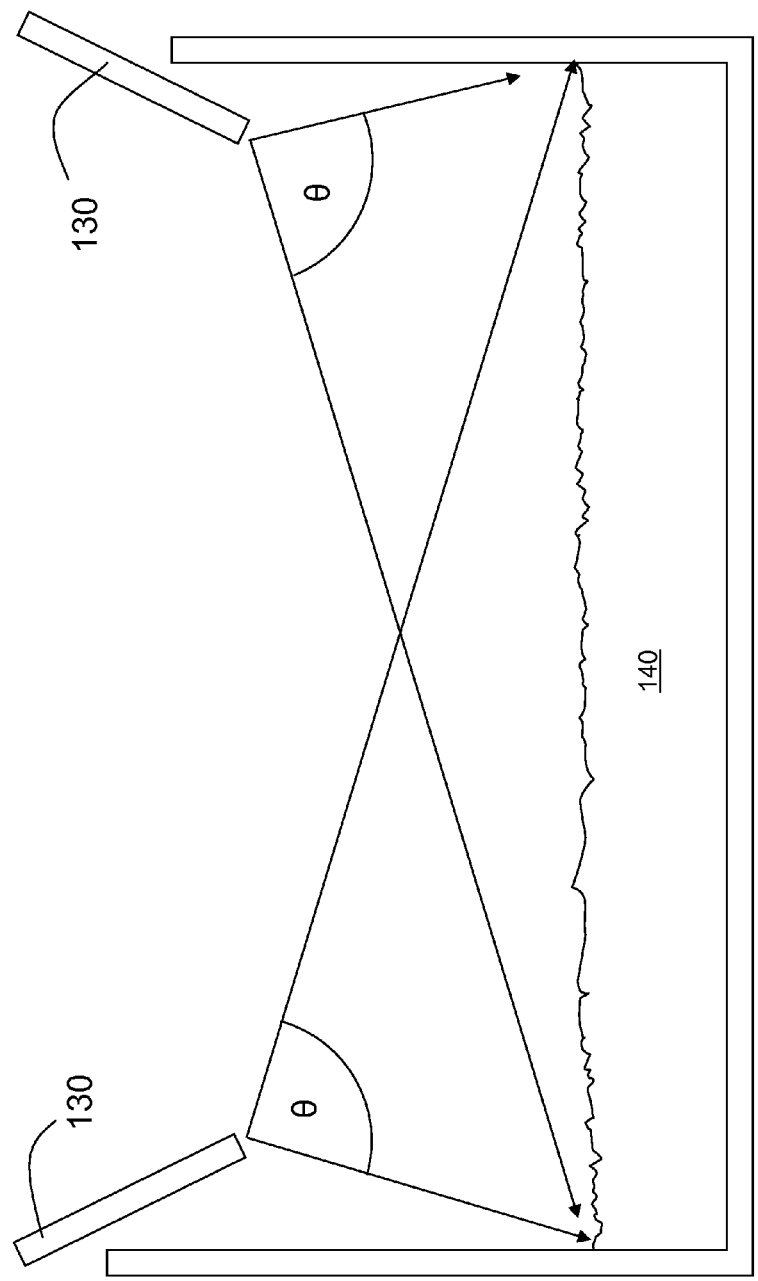
FIG. 20 is a schematic side view of an application of the lance in which the jet is vertically swept.
Figure 21:
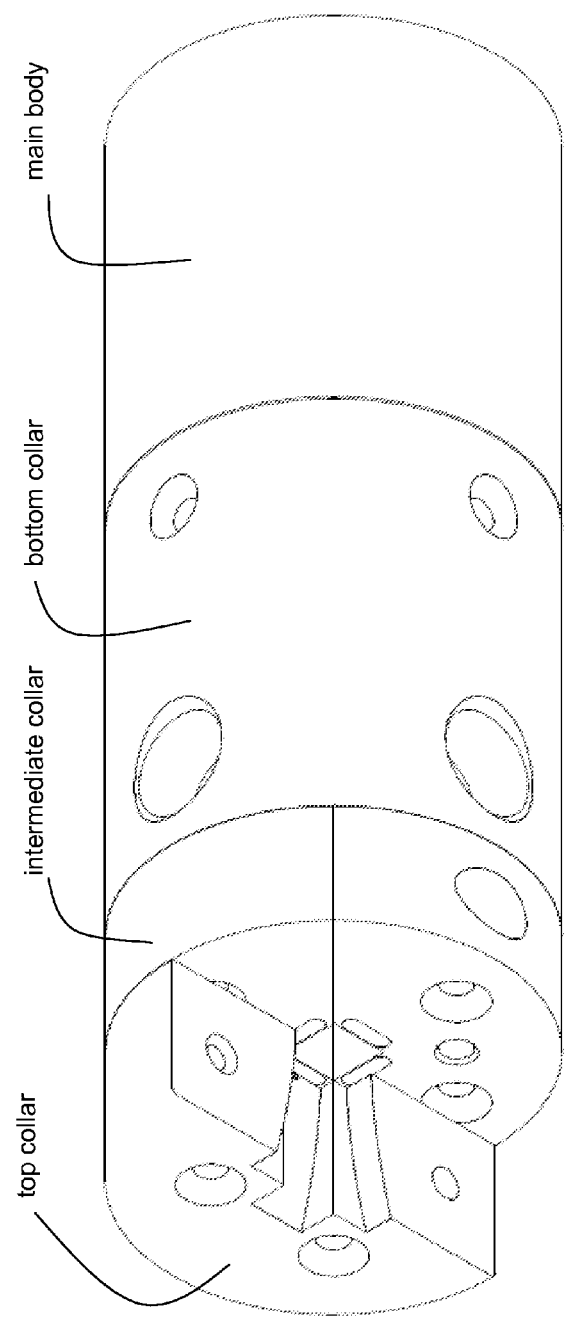
FIG. 21 is an isometric view of a lance with an extended collar with one segment removed.
Figure 22:
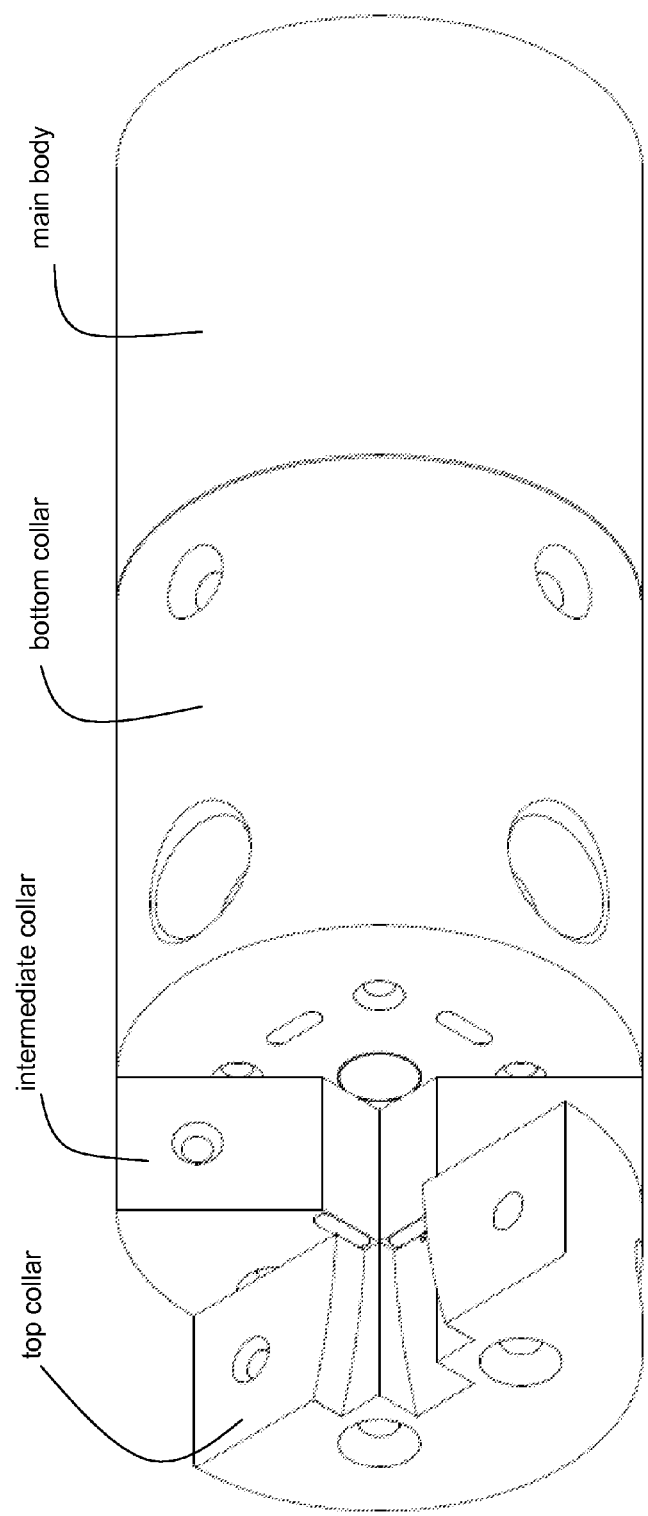
FIG. 22 is an isometric view of the lance of FIG. 21 with two segments removed.
Figure 23:
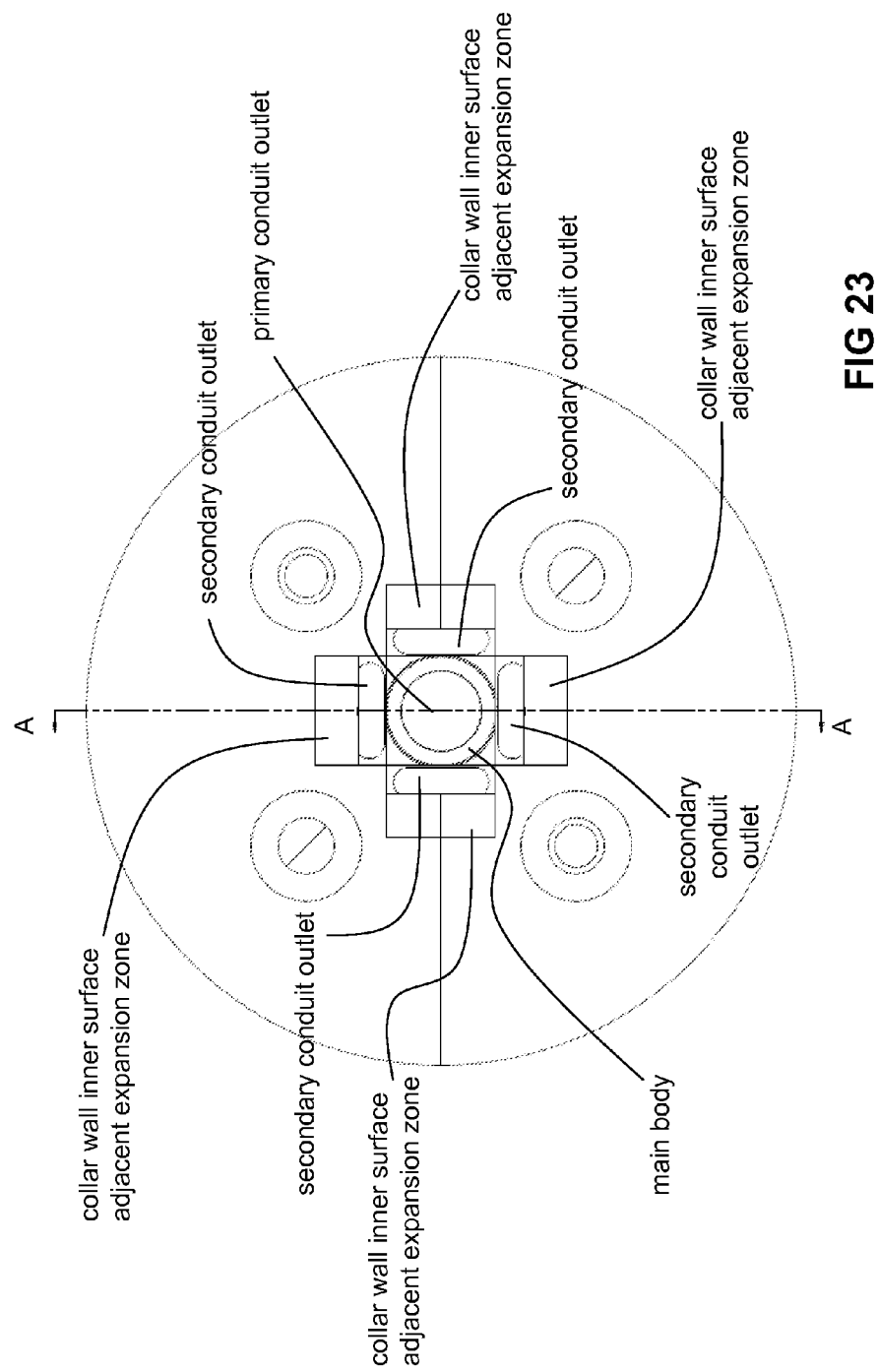
FIG. 23 is a top view of the lance of FIGS. 21-22.
Figure 24:
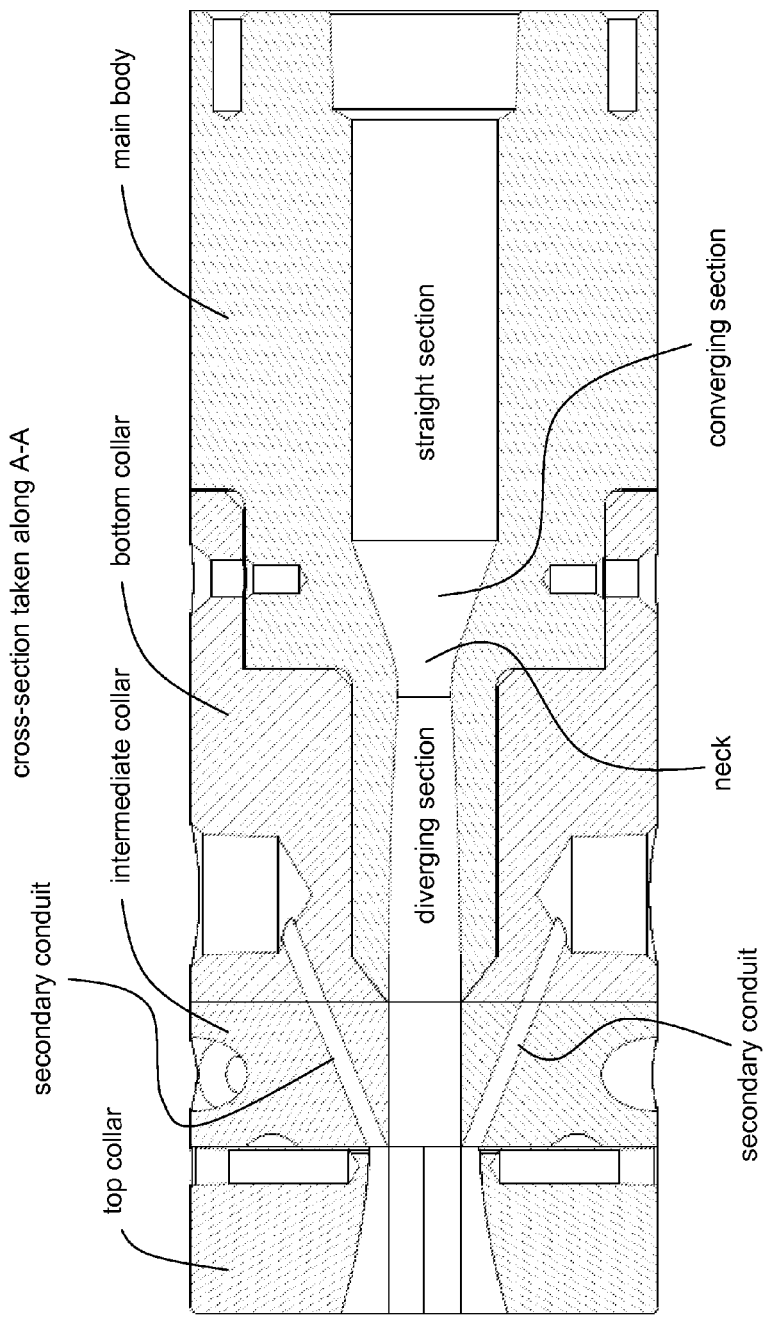
FIG. 24 is a cross-sectional view of the lance of FIGS. 21-23 taken along line A-A.

Some basic techniques applying the invention to an EAF are illustrated in FIGS. 18 and 19. The EAF 100 includes electrodes 110 which create hotspots 120. A plurality of supersonic lances 130 inject oxygen across a target area described by an arc sweeping across an angle θ. Through appropriate selection of the number and placement of the lances 130, a relative large area of the bath 140 in the EAF 100 can have oxygen injected therein. As best shown in FIG. 18, the lances 130 may be swept in a horizontal pattern. As best illustrated in FIG. 19, the lances 130 may be swept in a vertical pattern. As described above, combinations of vertical and horizontal sweeping are also possible.

The invention yields several advantages. When applied to metallurgical furnaces. It helps to reduce the tap-to-tap time through an increase in the bath area coverage. It also achieves better stirring of the bath. It further allows achievement of an optimal angle of attack. It allows dynamic control of the lance without subjecting moving parts to corrosive furnace gases and temperatures. The sweeping motion of the jet also prevents the localized generation of FeO caused by the oxidization of steel. It is well known that FeO is very corrosive to refractories so the sweeping motion will reduce the localized concentration in the slag. Thus, it reduces O2 waste and improves metal yield.

EXAMPLES

Several different supersonic-type lances were constructed based upon some of the above designs. Their ability to deviate a jet was tested under the following counterflow conditions. The jet flow rate was maintained around 400 Nm³/h (i.e. 400 normal cubic meters per hour) with a Mach number around 2.1. A flow rate for the counterflow was maintained at around 1 Nm³/h with a vacuum pressure of about 0.5 bar.

Lance design #1 was based upon the lance of FIGS. 16-18. Lance design #2 was based upon the lance of FIGS. 16-18 but instead of a converging nozzle for the primary conduit, a converging-diverging nozzle was used. Lance design #3 was based upon the lance of FIGS. 2A, 2B, 2C, 3, and 4. Lance design #4 was based upon the lance of FIGS. 10, 11, 12A-12B, 13A-13B, 14A-14D, and 15 where no grooves were formed adjacent to the corners. Lance design #5 was based upon the lance of FIGS. 10, 11, 12A-12B, 13A-13B, 14A-14D, and 15 this time with grooves formed adjacent to the corners. Lance design #6 was based upon a design illustrated in FIGS. 21-24 that includes an intermediate collar between the bottom and top collars that was designed to allow expansion of the jet before fluid contact with a counterflow vacuum stream. Lance design #7 was based upon the lance of FIGS. 7-9.

As shown in Table I, each lance design achieved a deviation angle of at least 5°. The third and fifth designs were found to have achieved the largest angle. Regardless of the lance design, we observed at most only about a 20% decrease in coherence using Schlerin techniques.

TABLE I

Deviation Angles Achieved By Various Lance Designs

| Design No. | Result |
|---|---|
| 1 | 10° |
| 2 | 5° |
| 3 | 15° |
| 4 | 12° |
| 5 | 15° |
| 6 | 5° |
| 7 | 10° |

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A lance for injecting a jet of a first gas into an interior of a reaction space, said lance comprising:
a main body having upstream and downstream ends and a plurality of conduits formed therein, each of the conduits extending between an associated inlet and an associated outlet, said plurality of conduits consisting of a primary conduit and 2-4 secondary conduits radially distributed around the primary conduit, each of the primary and secondary conduit outlets being disposed at the downstream end, the primary conduit inlet being adapted to be placed in fluid communication with a source of a first gas, the secondary conduit inlets are adapted to be placed in fluid communication with a source of vacuum or a source of a second gas, a terminal portion of the primary conduit at the downstream end extends along an axis; and
a collar comprising a wall extending around the primary and secondary conduit outlets from the main body downstream end, an inner surface of the wall diverging away from the primary conduit axis to define a vectoring space adapted to allow expansion of a jet of the first gas exiting the primary conduit outlet, wherein:
the source of the first gas is the same as or different from the source of the second gas; and
each of the secondary conduit outlet is disposed at locations adjacent the primary conduit outlet sufficient to fluidically deviate a jet of the first gas exiting the primary conduit outlet towards the collar inner wall surface adjacent one of the secondary conduit when that secondary conduit inlet is placed in fluid communication with either the vacuum source or the source of the second gas.

2. The lance of claim 1, wherein the primary conduit comprises a converging-diverging nozzle.

3. The lance of claim 2, wherein:
a cross-section of the collar wall inner surface taken along the primary conduit axis has an ellipsoid configuration having first and second ends; and
the lance comprises an additional secondary conduit formed in the main body that extends between a respective inlet and a respective outlet that is disposed at the main body downstream end, each of two secondary conduit outlets being disposed adjacent one of the first and second ends of the ellipsoidally configured collar wall inner surface.

4. The lance of claim 2, wherein:

a cross-section of the collar wall inner surface taken along the axis has a three-lobed configuration each lobe of which terminates in a tip; and the lance comprises two additional secondary conduits each of which is formed in the main body and extends between a respective inlet and a respective outlet that is disposed at the downstream end, each of the three secondary conduit outlets being disposed adjacent a respective one of the three tips.

5. The lance of claim 2, wherein:

a cross-section of the collar wall inner surface taken along the axis has a triangular configuration with three corners; and the lance comprises two additional secondary conduits each of which is formed in the main body and extends between a respective inlet and a respective outlet disposed at the downstream end, each of the three secondary conduit outlets being disposed adjacent to a respective one of the three corners.

6. The lance of claim 5, wherein the corners are rounded off.

7. The lance of claim 2, wherein:

a cross-section of the collar wall inner surface taken along the axis has a four-lobed configuration each lobe of which terminates in a tip; and the lance comprises three additional secondary conduits each of which is formed in the main body and extends between a respective inlet and a respective outlet disposed at the downstream end, each of the four secondary conduit outlets being disposed adjacent a respective one of the four tips.

8. The lance of claim 2, wherein:

a cross-section of the collar wall inner surface taken along the axis has a parallelogram configuration having four corners; and the lance comprises three additional secondary conduits each of which is formed in the main body and extends between a respective inlet and a respective outlet disposed at the downstream end, each of the four secondary conduit outlets being disposed adjacent to a respective one of the four corners.

9. The lance of claim 8, wherein the collar wall inner surface has at least two pairs of grooves formed therein, each groove of one of the pairs extending in a direction parallel to the primary conduit axis from opposite sides of a respective one of the four corners.

10. The lance of claim 1, wherein:

a cross-section of the secondary conduit outlet taken along the primary conduit axis has a kidney bean configuration;

the primary conduit outlet has a circular cross-section taken along the primary conduit axis; and the concave portion of the kidney bean configuration extends coaxially with and along a peripheral portion of the primary conduit outlet.

11. A lance for injecting a jet of a first gas into an interior of a reaction space, said lance comprising:

a main body having upstream and downstream ends and primary and secondary conduits formed therein, the primary conduit comprises a converging-diverging nozzle, each of the primary and secondary conduits extending between an associated inlet and an associated outlet, each of the primary and secondary conduit outlets being disposed at the downstream end, the primary conduit inlet being adapted to be placed in fluid communication with a source of a first gas, the secondary conduit inlet is adapted to be placed in fluid communication with a source of vacuum or a source of a second gas, a terminal portion of the primary conduit at the downstream end extends along an axis; and a collar comprising a wall extending around the primary and secondary conduit outlets from the main body downstream end, an inner surface of the wall diverging away from the primary conduit axis to define a vectoring space adapted to allow expansion of a jet of the first gas exiting the primary conduit outlet, wherein:

the source of the first gas is the same as or different from the source of the second gas;

the secondary conduit outlet is disposed at a location adjacent the primary conduit outlet sufficient to fluidically deviate a jet of the first gas exiting the primary conduit outlet towards the collar inner wall surface adjacent the secondary conduit outlet when the secondary conduit inlet is placed in fluid communication with either the vacuum source or the source of the second gas;

an inner surface of the wall has a circular cross-section taken along the primary conduit axis;

a plurality of dividers extend inwardly from the inner wall surface towards the primary conduit axis to define a respective plurality of expansion zones disposed between adjacent dividers; and the lance has a plurality of the secondary conduits each one of which extends between a respective inlet and a respective outlet disposed at the main body downstream end, each of the plurality of secondary conduit outlets being associated with a respective one of the plurality of expansion zones and disposed immediately upstream thereof.

12. The lance of claim 11, wherein:

the plurality of vectoring spaces consists of n expansion zones;

the plurality of secondary conduits consists of n secondary conduits; and n is an integer in the range of from 2-6.

13. The lance of claim 1, wherein a width or diameter of the secondary conduit outlet is between 0.01 to 2.0 times a width or diameter of the primary conduit outlet.

14. The lance of claim 1, wherein the collar has a height H extending from a plane including the primary conduit outlet and a terminal downstream portion of the collar, H being one to ten times the width or diameter of the primary conduit.

15. The lance of claim 1, wherein the collar inner wall surface diverges in straight-line fashion away from the primary conduit outlet.

16. The lance of claim 1, wherein the collar inner wall surface diverges in curved-line fashion away from the primary conduit outlet.

* * * * *